United States Patent [19]

McCaskill et al.

[11] Patent Number: 4,459,678
[45] Date of Patent: Jul. 10, 1984

[54] METHOD AND APPARATUS FOR PROCESSING A FILE OF RECORD INFORMATION

[75] Inventors: Rex A. McCaskill; John W. McInroy; Paul D. Waldo, all of Austin, Tex.

[73] Assignee: International Business Machines Corporation, Armonk, N.Y.

[21] Appl. No.: 264,945

[22] Filed: May 18, 1981

[51] Int. Cl.³ .............................................. G06F 7/04
[52] U.S. Cl. .................................................. 364/900
[58] Field of Search ... 364/200 MS File, 900 MS File, 364/200, 900

[56] References Cited

U.S. PATENT DOCUMENTS

| | | | |
|---|---|---|---|
| 4,068,298 | 1/1978 | Dechant et al. | 364/200 |
| 4,068,300 | 1/1978 | Bachman | 364/200 |
| 4,315,309 | 2/1982 | Coli | 364/200 |
| 4,370,707 | 1/1983 | Phillips et al. | 364/200 |
| 4,416,558 | 11/1983 | McInroy et al. | 364/900 |
| 4,417,321 | 11/1983 | Chang et al. | 364/900 |

Primary Examiner—Joseph F. Ruggiero
Assistant Examiner—Mark P. Watson
Attorney, Agent, or Firm—Harold E. Meier

[57] ABSTRACT

An information processing system is disclosed which includes a display, a memory, a keyboard and a control unit. The system may store and display data in a table format by record and field. The system may be employed in an entry edit mode whereby data is entered or edited by an operator through the keyboard into the system. The system may also operate in a record selection mode whereby data in a field having a predetermined relation to a field value may be selected by the system. The system permits the entry of comparison operators and field values below the field heading in the display for the field to be searched. The keys representing the comparison operators and the keys representing data are at separate locations on the keyboard to prevent operator error in input. This feature is particularly advantageous when one symbol may be employed both as a comparison operator and data. Such a symbol would then be represented by two keys on the keyboard. The system also includes a syntax check routine which acts to detect syntax errors in data entered. The system rejects the improper data and informs the operator through the display. The syntax check routine also may be programmed for the type of data to be entered into each field. The routine will then check each data to be entered in a given field to determine if the data is of the proper type.

25 Claims, 3 Drawing Figures

METHOD AND APPARATUS FOR PROCESSING A FILE OF RECORD INFORMATION

BACKGROUND OF THE INVENTION

1. Field of the Invention

This invention relates to information processing systems and more particularly to input, edit and selection of data in an information processing system.

2. Description of Prior Art

It is often quite useful in information processing and other computer related fields to display information in a table format. In the past, the information in a table has been entered into an information processing system in a manner identical to the entry of text. The data in the table was also stored in a memory in the same manner as the text. Edit and recall of the data in the table was also identical to edit and recall of text, i.e., line by line and character by character.

Recently, information processing systems have been developed which store the data in a table in groupings or fields related to their informational content. This has permitted recall of the data in one or more fields individually if desired. It has also made possible the selection of discrete portions of data in a given field or fields which have a predetermined relation to a desired field value.

For example, the age of each person in a given group may form one field. If, for example, it is necessary to find the members of the group that are older than 40, current information processing systems permit the insertion of the field value, in this case 40, and a comparison operator, in this case a greater than function, for finding ages greater than the field value. The system compares all the data in the age field with the field value to find those entries over 40.

To perform this type of comparison function, the information processing system must include a query language. The system must include a keyboard input to permit the operator to command the system to perform the comparison function. In one type of system, an operator keyed language is employed. Such a language requires the actual logic statement to be written out. For example, it might be necessary to type " . . . age is greater than 40 . . . " to instruct the system to perform the desired selection. An operator keyed language sometimes requires considerable operator time to operate. Another disadvantage is the operator must be familiar with the syntax rules of the language in the system as well as the various field names in the file of information to be queried. No prompting is done by the system during the keying of the query, that is, the operator starts each query with a "Blank page". The operator must also wait until the query has been attempted against the file of information before any syntax errors are detected by the system.

Another language employing an option ring may be used in systems having a display such as a video screen for use by the operator. Three function boxes are displayed. The first function box is employed to define the field desired. The function box will display field 1 initially. A key on the keyboard may be operated to display the next option, field 2. The key is pressed until the desired field is displayed. The operator may then activate a second key directing the system to perform the comparison function on the field displayed.

The second function box displays initially a comparison operator. The comparison operator may be an equal sign, a greater than sign, a less than sign or any other operator. Another key on the keyboard is activated by the operator to display in sequence the comparison operators in the system until the desired operator is shown. Another key would then be activated to indicate to the system that the displayed operator is to be used. The third box may be employed to type in the field value. For example, with the example cited above, the field value typed in would be the number 40.

The option ring query language permits the operator to employ a menu driven language. That is, a comparison operator may be entered into the system by merely pressing a few option selection keys rather than typing the entire function as required in the operator keyed language. However, time delays arise in cycling through the nonselected options.

One query language entitled "Query by Example" (QBE) has been developed for use on an IBM system which can display data in a table format. Typically, the data forming a single field would be in a vertical column headed by the field heading. One example of such a field would again be the age of a group of persons. A number of fields may be placed across the display to form rows of data. For example, the data concerning a single person may be provided along a single horizontal row. Each piece of data in the row would represent a particular bit of information about the person and each piece of data would be stored in the appropriate field for age, hair color, etc.

In the QBE language, to test for "age greater than 40" the operator would position a cursor on the display from a keyboard under the age column of the table and type ">40". This is an efficient and straightforward method for specifying this query. However, if the operator wants to select all data that is between 30 and 40 years old the query mechanism becomes more cumbersome. In this situation, a signaling element is typed under the field to be examined. This signaling element may, for example, comprise the symbol X. The operator then activates a key on the keyboard of the system which directs the system to display a condition box on the display. The operator would then type into this condition box the desired logic function. For example, the operator may type "30=< X=<40". Entry of these instructions in the condition box permits the system to perform the desired selection of data from the age field having the desired range of values. In this example, the system would find each entry of an age greater than or equal to 30 and less than or equal to 40.

While the QBE language has been found to be satisfactory, it induces some delay when the operator must translate the cursor from beneath the field heading desired to the condition box to enter the desired function. The QBE language also employs keys which may be used to represent either data or a comparison operator. For instance, the symbol = may be used to compare one value to another or be an actual part of data stored in the system. To distinguish the functions, the QBE language, and many other such languages, place the symbol between quotation marks or other arbitrary boundary symbols so that the system interprets the character between the boundary symbols as actual data. Naturally, special rules become necessary if the boundary symbol itself may be employed as data or a comparison operator. This induces an undesirable complication in the system.

Another shortcoming of many systems is the requirement to find exact syntax equivalence between two pieces of information before finding correspondence. For example, some systems would not find the names Vandermere and Van der mere to be the same from the spaces within the latter name, although their meaning may be identical.

SUMMARY OF THE INVENTION

In accordance with the present invention, a system for processing information is provided. The system includes a keyboard structure for operator entry of keystroke information representing either data or a comparison operator. Memory structure is provided for storing data input thereto. Each data portion stored is identified by a position within a table format by a field and a record. Each of the fields includes a field heading. Display structure is provided for displaying selected data in the table format when the system is in an entry edit mode. The table format displays data in the field and record with which the data is identified. The display further has a field heading to indicate each field and a cursor. Central control structure interfaces between the keyboard structure, memory structure and the display structure. The central control structure permits a comparison of the data within a field to a field value entered therein in a record selection mode. The comparison is defined by a comparison operator entered therein. The field compared is determined by the position of the cursor on the display during entry of the comparison operator and field value and the comparison operator and field value are displayed under the field heading of the field compared.

In accordance with yet another aspect of the present invention, the system for processing information comprises a central control structure which emphasizes the comparison operator displayed on the display structure to distinguish the comparison operator from data.

In accordance with yet another aspect of the present invention, the keyboard structure for use in the information processing system includes keys for entering keystroke information representing data and comparison operators which are physically separated on the keyboard structure to assist the operator selection.

In accordance with yet another aspect of the present invention, the syntax of information to be stored in each field may be stored in the control structure. Each individual data portion entered in the keyboard structure for entry into the field is compared with the proper syntax. Improper syntax is immediately detected by the control structure. The operator is notified of the error through the display structure, and correction is required by the control structure before the comparison is attempted.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
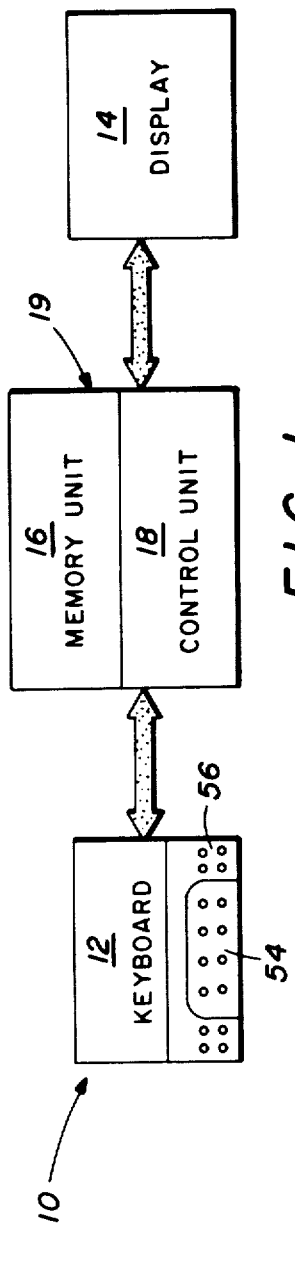
FIG. 1 is a block diagram of an information processing system in which the present invention is incorporated.

Referring now to the Drawings, wherein like reference characters designate like or corresponding parts throughout several views, FIG. 1 illustrates an information processing system 10. The system 10 may be used for creating and editing a text which is entered by an operator at keyboard 12. A display 14, such as a video display, is provided to permit the operator to monitor the information input into the system. A memory unit 16 is provided to store information input to the system. A control unit 18 interfaces with the keyboard 12, display 14 and memory unit 16 to control operations of the system. The memory unit 16 and control unit 18 are shown in a single unit. The entire system could be mounted in one housing at the operator's station.

In addition to textual information, the system 10 also permits the entry of data in a table format. The system 10 also permits a comparison of the data stored therein with another factor. For example, a business may wish to retain information concerning job applicants. This information would typically comprise a record for each person, including their name, age, college (if applicable) and their grade point average (GPA) among other items. The system 10 will permit, for example, the operator to direct the system 10 to select the records for each applicant having a GPA within a preselected range. The system 10 therefore forms a powerful tool to reduce and present data in a meaningful manner.

The system 10 typically operates in one of two modes during operations concerning the data in the table format. The first mode is an input edit mode. In this mode, the data may be entered by the operator into the system in the table format or edited as necessary to update the data. The system 10 may also be operated in a record select mode. In this mode, one or more comparison conditions may be selected for comparing data stored in the table format to field values to locate records having data with the desired relation.

Figure 2:
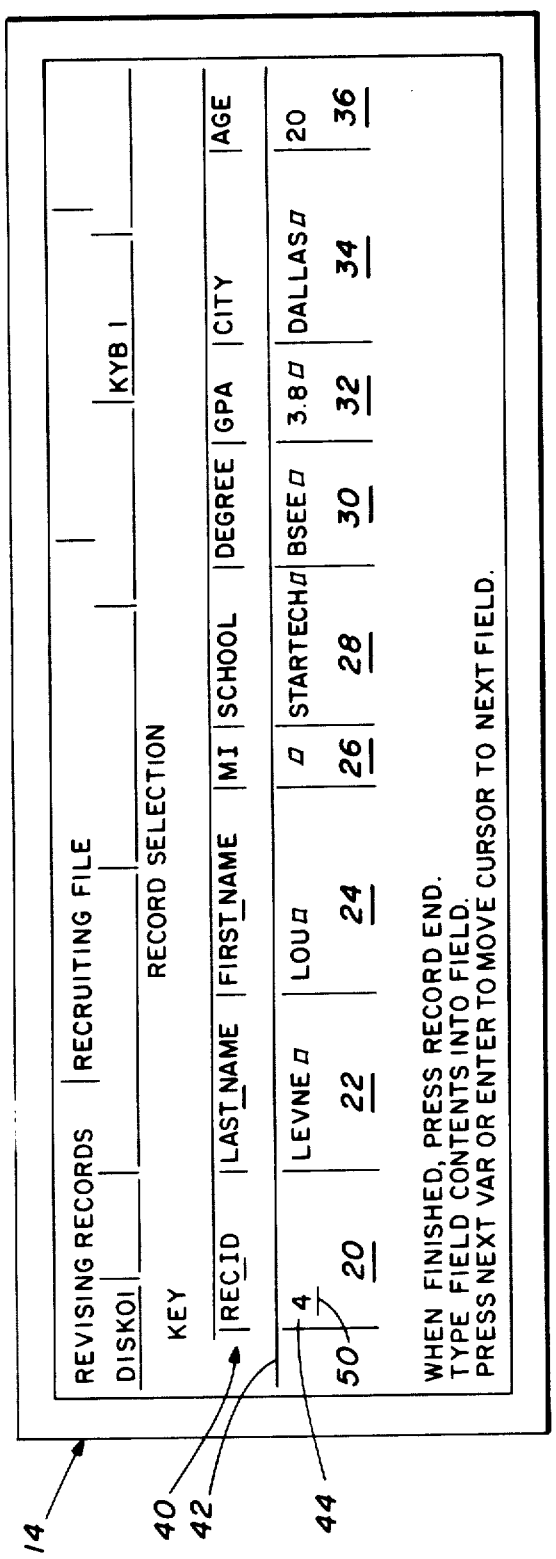
FIG. 2 illustrates the display of the information processing system during the input and edit mode.

It is necessary to begin the setup of the table format by defining one or more fields. The explanation of this operation will become clearer with reference to FIG. 2. FIG. 2 illustrates the appearance of display 14 during the input edit mode of operation. Each vertical column 20 through 36 represents one field of data. Each field has a field name selected by the operator positioned in horizontal row 40 directly above the field. For example, field 20 is identified as record identification (REC ID). A horizontal line 42 separates the field headings from the data in the field below the line.

The heading "revising records" on the display indicates the fact that the records stored in memory unit 16 may be edited or processed by operator input in system 10. The heading "DISK01" identifies the file in memory to which operations are to be performed. The heading "KYB1" identifies the particular set of keyboard characters system 10 is using. For example, the keyboard characters will vary between languages, such as English, German and French and it is necessary to identify the set in current use in the system.

The example illustrated in FIG. 2 relates to the recruiting file of a company. The row of data 44 represents all the relevant data for a given individual or a single record. The data is entered by an operator in the following sequence. A display cursor 50 is positioned on the display at the position where data is to be entered. The cursor position is controlled from keyboard 12. The data may then be entered by the operator by depressing appropriate keys to create keystroke information in the system. In establishing each file, system 10 permits the operator to define within control unit 18 of the system the type of data that will be entered in each field. In one embodiment of system 10, the operator may require the data in a field to be from one of three separate type classifications; numerical, characters or text.

If the numerical field restriction is required, as could be done in field 32 having the GPA records, the system 10 would permit entry of only numbers in this field. This would, for example, prevent the operator from attempting to insert a name in this field. The numeric field will also permit the sign of a number to be included. For data to be classified in the numeric field, the data must be capable of undergoing numerical operations. For example, it may be desirable to add the GPA's for all individuals having records stored in the system 10 and divide by that number to find the average.

The definition of the character field is broader. The character field includes the alphabet, numbers and other characters. However, it does not include control functions, such as carriage return.

The text field is the broadest field. The text field includes all permissible data in the character field and control functions, such as carriage return. The text field is intended to be primarily for descriptive text within the system 10.

The system 10 detects data attempted to be entered by the operator which does not satisfy the type requirements of the field chosen by use of a syntax checking routine in control unit 18. The operator is notified of the error and correction is required by the system 10 before the comparison is attempted. Furthermore, the system 10 can ignore certain characters in data which have no relevance to their meaning during execution of the comparison activity. For example, system 10 will permit spaces and hyphens to be ignored. The data "Smith" would be considered identical as the data "Smith". In another example, the data Vandermere would be considered equivalent to Vander mere and Van der mere. By ignoring the hyphen, the data re-examine would be considered equivalent to the data reexamine. Other characters which may be ignored are apostrophes, required spaces and underscoring.

The system 10 therefore provides great flexibility in permitting irrelevant characters to be ignored. Concurrently, the system resists error in checking the type of data input to insure that it corresponds to the type of data to be found in the field in which it is to be entered.

Figure 3:
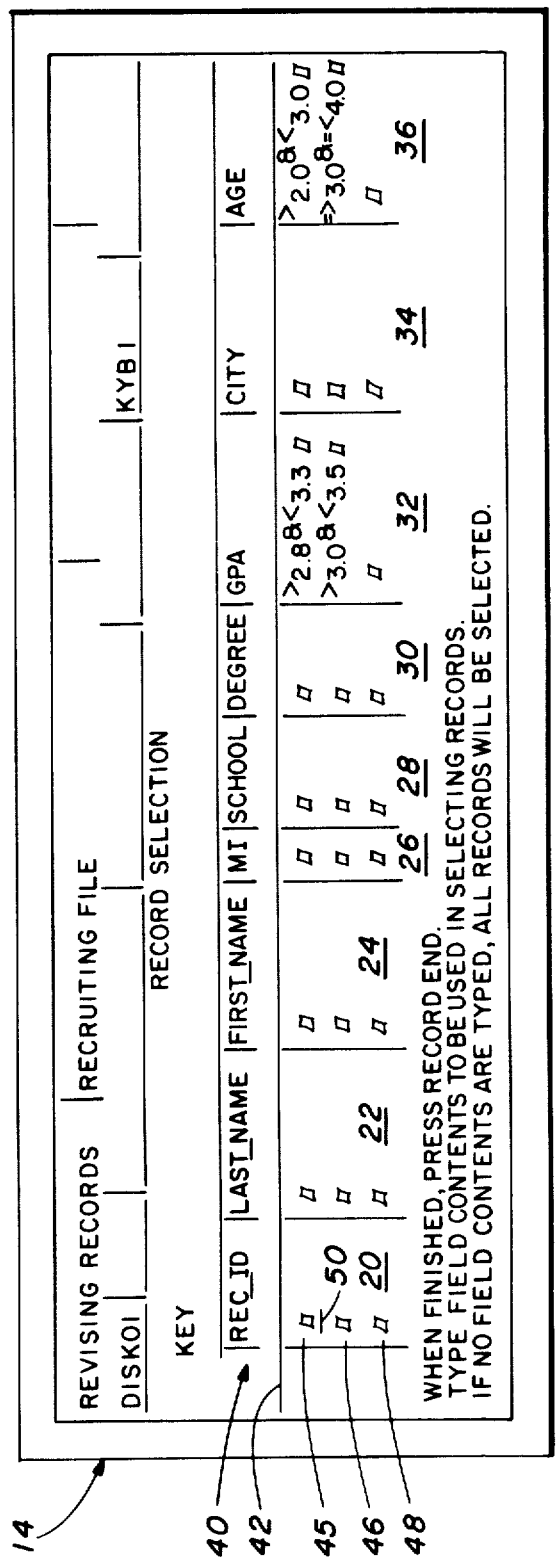
FIG. 3 illustrates the display of the information processing system with the system in the record selection mode.

In the record selection mode, the display 14 would appear as illustrated in FIG. 3. The field headings in the heading row 40 would remain displayed as shown. The rows 45, 46 and 48 are not used to display the data in records in the individual fields. When the system 10 is initialized, the cursor 50 will move automatically to the first character position in row 45 under the record identification file heading. The operator may then enter through the keyboard 12 a number of comparison operators, logic operators and field values to perform desired functions on the data stored in the system.

The keyboard 14 is designed to have two distinct sections of input keys. The inboard section 54 will include the data keys, such as numbers and letters. The outboard section 56 may include the comparison operators, logic operators and other functions. The physical separation of the inboard and outboard sections prevent the operator from interchanging inputs. The comparison operators in one system may include the following symbols: >, <, =, ≠, which represent the functions: greater than, less than, equal and not equal, respectively. The logic operators may include the following symbols: & and |, which represent the logic connectors and and or, respectively. The keyboard generates distinct keyboard information for processing by the control unit 18 when a single symbol is used as a comparison or logic operation and data.

If, for example, the operator wished to find all persons in their recruiting file that had a GPA between 2.8 and 3.3, the operator would initially move the cursor 50 across row 45 to the initial character space under the field heading GPA. The operator would then type > by depressing the appropriate key in the outboard section 56. The symbol will be entered into the system 10 and displayed as shown in FIG. 3. The system automatically emphasizes the comparison operators. The display illustrated in FIG. 3 displays the comparison operator symbols half-indexed up to indicate to the operator that it is a comparison operator as opposed to a character. The operator would then continue the entry of the condition by typing in the lower field value 2.8 as shown in FIG. 3.

The operator then returns to the outboard section of the keyboard to depress the key inputting the symbol & which indicates the logical operator "and". Again, the symbol is half-indexed up automatically by the system 10 to indicate its function as a logical operator. The operator then presses the key in the outboard section representing the symbol <. This symbol is again half-indexed up automatically. The operator finally inserts the upper field value 3.3.

At this point, the operator may direct the system 10 to compare the data stored in the field 32 to the selection criteria entered for all records in the file searched. Prior to performing this function, however, the system 10 will initiate a syntax check of the selection criteria. A syntax check would also be performed if the operator attempted to move the cursor 50 outside the field in that row.

Table II illustrates the logic of the syntax check routine for the record selection mode. Table I includes several definitions employed to interpret the logic of Table II. This logic would be implemented in control unit 18 by hardware obvious to one skilled in the art.

TABLE I

| A. Abbreviations | |
|---|---|
| exp | = expression |
| oper | = operator |
| LT | = less than |
| GT | = greater than |
| EQ | = equal |
| NE | = not equal |
| Dec Pt | = decimal point |
| B. Logic expressions | |
| : : = | = is defined to be |
| \| | = or |
| < > | = surrounds a portion of the material into system 10 |

TABLE II

2. The syntax for the record selection mode is:
<EXP> : : = <NULL> | <NON-NULL EXP>

TABLE II-continued

```
<NON-NULL EXP> :: = <TERM> | <TERM><LOGICAL OPER><NON-
NULL EXP> | <FILL><NON-NULL EXP><
FILL>
<FILL>
<LOGICAL OPER> :: = <FILL><OR><FILL> | <FILL><AND>
<FILL>
<OR> :: = CONTROL DISPLAYED AS |, HALF INDEXED UP
<AND> :: = CONTROL DISPLAYED AS &, HALF INDEXED UP
<FILL> :: = <NULL> | <SPACES>
<NULL> :: = NO CHARACTERS
<SPACES> :: = <SPACE> | <SPACE><SPACES>
<SPACE> :: = THE SPACE CHARACTER
<TERM> :: = <FACTOR> | <COMPARE OPER><FILL><FACTOR>
<COMPARE OPER> :: = <LT> | <GT> | <EQ> | <NE> |
<LT><FILL><EQ> | <EQ><FILL><LT>
<GT><FILL><EQ> | <EQ><FILL><GT>
<LT> :: = CONTROL DISPLAYED AS <, HALF INDEXED UP
<GT> :: = CONTROL DISPLAYED AS >, HALF INDEXED UP
<EQ> :: = CONTROL DISPLAYED AS =, HALF INDEXED UP
<NE> :: = CONTROL DISPLAYED AS AN EQUALS WITH A SLASH
THROUGH IT, HALF INDEXED UP
<FACTOR> :: = IF A CHARACTER FIELD, THEN <CHARACTER
FACTOR>
IF A NUMERIC FIELD, THEN <NUMBER>
<CHARACTER FACTOR> :: = <DATA STRING> | <VARIABLE LENGTH
MASK> |
<DATA STRING><VARIABLE LENGTH
MASK>
<DATA STRING> :: = <DATA CHARACTER> | <DATA CHARACTER>
<DATA STRING>
<DATA CHARACTER> :: = <ANY VALID CHARACTER>
| <POSITIONAL MASK>
<POSITIONAL MASK> :: = CONTROL THAT DISPLAYS AS .,
HALF INDEXED UP
<VARIABLE LENGTH MASK> :: = CONTROL THAT DISPLAYS AS
?, HALF INDEXED UP
<NUMBER> :: = <VALUE> | <SIGN><VALUE>
<SIGN> :: = + | −
<VALUE> :: = <DIGITS> | <DEC PT><DIGITS> | <DIGITS>
<DEC PT><DIGITS> | <DIGITS><DEC PT>
<DIGITS> :: = <NUMERIC> | <NUMERIC><DIGITS>
<NUMERIC> :: = 0 | 1 | 2 | ... | 9
<DEC PT> :: = . | : | ,
```

The system 10 also permits certain characters to be ignored in defining the record selection. For example, trailing spaces, hyphens, apostrophes, required spaces and underscoring may be ignored by the system 10. The syntax check routine may also be employed to insure the field value entered with the comparison operators is valid. For example, entry of the field value 3.3.3 in lieu of 3.3 in row 45 would be detected as an error by the syntax check routine. In a second example, the entering of the field value 3.3+ in lieu of 3.3 would also be detected as an error since the sign is improper following the number. The syntax check routine may also be employed to prevent the entry of two or more consecutive logic operators. For example, the input of the selection criteria >2.8 && <3.3 would be detected as an error. The presence of two consecutive logic operators & is an inoperative instruction.

The operator may enter further selection criteria in the same row. For example, as shown in FIG. 3, selection criteria has been entered in column 36. This criteria requires the age of the applicants to be between 20 and 30 years. Selection criteria occuring in the same horizontal row are combined with a logical "and" operation. That is, when so directed, the system 10 will search for applicants having a GPA between 2.8 and 3.3 and an age between 20 and 30.

Selection criteria may be entered in following rows. As shown in FIG. 3, row 46 may include the selection criteria for selecting applicants having a GPA between 3.0 and 3.5 and an age between 30 and 40 inclusive. Selection criteria between rows is combined with the logical "or" function. Therefore, system 10 will search for individuals satisfying the criteria of row 45 or individuals satisfying the critieria of row 46.

The symbols employed as comparison and logic operators may also be used as data stored within the system 10. To distinguish the meaning of a symbol as data and as a comparison or logic operator, duplicate keys representing the same symbol are provided on the keyboard 12. The key representing the symbol as data is positioned in the inboard section 54. The key representing the symbol as a comparison or logic operator is positioned in the outboard section 56. The operator will therefore not confuse the two functions of the symbol. As noted previously, the keystroke information generated for the symbol as data is distinct from the information generated for the symbol as an operator and the symbol employed as a comparison or logic operator will be half indexed up on the display. This will permit the operator to instantly determine the meaning of the symbol. While the symbol may be half indexed up to denote its meaning, any other suitable technique for distinguishing or emphasizing the symbol from its data meaning may be employed. For example, the symbol may be flashing or underlined or highlighted in contrasting shades on the display.

The system 10 has significant advantages over the prior known systems in the record selection mode. The system 10 resists errors by checking the type entered in the syntax check routine. This prevents entry of clearly invalid data, such as "Smith" entered in the GPA field requiring a number. However, the system 10 permits great flexibility in ignoring leading or trailing spaces, hyphens, apostrophes, underscoring or other stylistic differences irrelevant to the meaning of the data entered during execution in comparing data.

The use of comparison and logic operator keys positioned in the outboard section of the keyboard also provides several advantages. The keyboard 12 provides great clarity in use. A symbol employed as a comparison or logic operator is entered at a separate and physically distinct portion of the keyboard from the symbol entered as data.

The entering of selection criteria at the intersection of the desired record and field in the table format display permits the system to operate without an option ring. The operator may readily enter the selection criteria at the appropriate spot without the necessity of moving to a condition box to enter selection criteria as done in prior systems.

Each of the processes and steps of the system 10 described herein may be implemented in a system by the pseudocode of the following table. The implementation may, for example, be made on a Model 8086 microprocessor made by Intel Corporation of 3065 Bowers Avenue, Santa Clara, Ca. 95051. The pseudocode describes the instructions for running the algorithms in the system 10 to perform the desired operations. The application and use of pseudocode is described in "An Introduction to Programming," (A Structual Approach Using PL/1 and PL/C-7), 2nd Ed. by Richard Conway and David Gries, Winthrop Publishers, Cambridge, Mass., copyright 1975, which disclosure is hereby incorporated by reference. It would be obvious to one skilled in the art to use the following pseudocode to implement the present invention.

The listings below are divided into programs (CSECT), each performing a separate function. Each program, in turn, includes a prologue, a main psuedocode section and may include one or more subroutine pseudocode sections. A general description of the function of each routine follows:

RQLKERCH—This routine performs the syntax verification during keying of the selection criteria and during the entry of data for storage in a file and identified by a field and record.

RQLTSTR—This routine performs the test of a record against the selection criteria. The algorithm contained in this routine performs the implicit AND and OR operations determined by the spatial relationships of the criteria and the field headings, as entered by the operator.

RQLCHCRT—This routine performs the test of a selection criterion on one field. The syntax of the criterion must be that defined and verified in RQLKERCH. This is where the operator entered "&" (AND) and "|" (OR) operators are scanned and interpreted.

RQLARCMP—This routine compares two numbers to determine which is larger or if they are equal. The numbers must be syntactically correct as defined and verifed by RQLKERCH. This is the comparison routine used for fields having arithmetic entries.

RQLCSCMP—This routine compares two character strings to determine which is larger or if they are equal. This is the comparison routine used for character fields. If one of the strings is a "control" string then it is assumed to be a qualifying parameter and may contain masking characters. Note that the logical operators and comparison operators have already been eliminated by the processing of RQLCHCRT. This routine contains the implementation of the function of the masking characters (i.e., the semantics of the masking characters.)

In one system incorporating the teachings of the present invention, two masking characters are used. In comparing character string A with character string B, the masking character "·" may be inserted in string A at one or more character positions. This instructs the system to treat whatever character is in string B at the corresponding character position as equal to "·". A second masking character "?" at the end of string A indicates to the system that the comparison is to be made between the strings only for characters positioned before the "?".

```
*) COMMENTS RIGHT                                                          00005000
*************************=START-OF-SPECIFICATIONS-*********************** 00006000
*                                                                       * 00007000
* PROGRAM NAME: RQLKERCH                                                * 00008000
*                                                                       * 00009000
* DESCRIPTIVE NAME: KEYSTROKE ERROR CHECK KEYSTROKE PROCESSOR            * 00010000
*                                                                       * 00011000
* COPYRIGHT:    XXXX-XXX (C) COPYRIGHT IBM CORPORATION 1980              * 00012000
*               LICENSED MATERIAL - PROGRAM PROPERTY OF IBM              * 00013000
*               REFER TO COPYRIGHT INSTRUCTIONS FORM NO. G120-2083       * 00014000
*                                                                       * 00015000
* STATUS: RELEASE RS2, COMPONENT RQL, VERSION 00.04                      * 00016000
*                                                                       * 00017000
* FUNCTION:                                                              * 00018000
*     ONE OF THREE TYPES OF CHECKS IS MADE.   IF THE CHECK IS FOR        * 00019000
*     A KEYSTROKE, THEN THE KEYSTROKE IS CHECKED TO SEE IF IT IS         * 00020000
*     VALID FOR THE FIELD TYPE. IF THE CHECK IS FOR EXPRESSION           * 00021000
*     SYNTAX, THE DATA POINTED TO IN THE INPUT IS SCANNED TO SEE         * 00022000
*     IF IT IS SYNTACTICALLY CORRECT.  IF THE CHECK IS FOR TERM          * 00023000
*     SYNTAX, THE DATA IS SCANNED TO SEE IF A TERM EXISTS AT THE         * 00024000
*     BEGINNING OF THE DATA.  A POINTER IS RETURNED SHOWING THE          * 00025000
*     END OF THE TERM  IF A VALID TERM IS FOUND.  THE SYNTAX FOR         * 00026000
*     EXPRESSION, TERM AND THE OTHER PIECES OF A QUALIFICATION           * 00027000
*     CONDITION ARE DESCRIBED IN THE PSD AND IN THE NOTES BELOW.         * 00028000
*                                                                       * 00029000
* NOTES:                                                                 * 00030000
*                                                                       * 00031000
*   DEPENDENCIES:                                                        * 00032000
*                                                                       * 00033000
*   RESTRICTIONS:                                                        * 00034000
*                                                                       * 00035000
*       ONLY ARITHMETIC AND CHARACTER FIELDS CAN BE CHECKED USING        * 00036000
*       THIS CSECT (THIS CSECT CAN NOT BE CALLED IF THE FIELD TYPE       * 00037000
*       IS TEXT).                                                        * 00038000
*                                                                       * 00039000
*       THIS CSECT ASSUMES THAT ONLY CODE PAGES 256,257 AND              * 00040000
*       258 ARE ALLOWED. ALSO, SINCE THE ONLY INVALID                    * 00041000
```

```
*       KEYS ARE THOSE DETECTED IN ARITHMETIC FIELDS AND THE
*       VALID KEYS ARE CODE PAGE INVARIANT (IN THE ABOVE CODE
*       PAGES). THE HEX CODE ALONE IS USED TO DETERMINE IF
*       THE KEY IS VALID FOR AN ARITHMETIC FIELD. SINCE THE
*       ALLOWED ARITHMETIC KEYS ARE THE DIGITS 0-9, COMMA,
*       COLON, PERIOD, SYLLABLE HYPHEN AND PLUS. THESE
*       KEYS ARE TESTED FOR AND OTHERS REJECTED. THE ONLY
*       RESTRICTION FOR CHARACTER FIELDS IS THAT THE HEX CODE
*       BE X'40' OR ABOVE. THIS CSECT WILL ONLY VERIFY
*       CHARACTER CODES FOR ARITHMETIC AND CHARACTER FIELD
*       TYPES.
*
* REGISTER CONVENTIONS: STANDARD PANTHER REGISTER CONVENTIONS
*
* PROGRAM TYPE: PROCEDURE
*
*   PROCESSOR: 370 HOSTED 8086 ASSEMBLER
*
*   PROGRAM SIZE: 281 LOC/716 BYTES
*
*   ATTRIBUTES: REENTRANT
*
* ENTRY POINT: RULKERCH
*
*   LINKAGE: INVOKE
*
* INPUT:
*       - BP POINTS TO EXPLICIT STACK PASSED PARAMETERS. THE
*         FOLLOWING LIST GIVES THE OFFSET FROM BP AND THE
*         PARAMETER:
*               0 - TYPE OF CHECK:
*                   1 = KEYSTROKE
*                   2 = EXPRESSION SYNTAX
*                   3 = TERM SYNTAX
*               2 - TYPE OF FIELD
*                   CHARACTER OR ARITHMETIC
*               4 - IF TYPE = 1, KEYSTROKE
*               4 - IF TYPE = 2 OR 3, LENGTH OF EXPRESSION
*         THE REMAINING PARAMETERS ARE ONLY PASSED FOR TYPE 2 OR
*         3:
*               6 - ADDRESS POINTER TO EXPRESSION
*               8 - SEGMENT POINTER TO EXPRESSION
*
* OUTPUT:
*       - RETURN/REASON CODE IN AX
*       - IF THE TYPE WAS 'TERM SYNTAX' THEN SP POINTS TO A
*         POINTER TO THE BYTE AFTER THE TERM.
*
* EXIT-NORMAL:
*       RETURN CODES
*           0 - SUCCESSFUL
*           2 - UNSUCCESSFUL
*
*       REASON CODES
*           NONE.
*
* EXIT-ERROR: NONE
*
* EXTERNAL REFERENCES:
*
*   ROUTINES:
*
*   DATA AREAS:
*
*   CONTROL BLOCKS:
*       NONE.
*
*   TABLES:
*       A TABLE OF VALID KEYS IS USED TO DETERMINE
*       A VALID KEY CODE IN AN ARITHMETIC FIELD. THE
*       TABLE IS A LIST OF ONE BYTE HEX CODES THAT ARE
*       CODE PAGE INVARIANT (SEE THE RESTRICTION ABOVE).
*
*   MACROS:
*
* CHANGE ACTIVITY:
*   1. 01/27/81 - FIXED ERRORS IN THE TERM SYNTAX FUNCTION
*   2. 02/18/81 - PUT MESSAGE FOR INVALID KEY IN THIS CSECT
*                 INSTEAD OF IN RCLKCINS.
*   3. 03/09/81 - PUT IN FIX TO CHECK FOR A NULL TERM AFTER THE
*                 LAST LOGICAL OPERATOR.
*   4. 04/07/81 - PUT IN CHANGES FOR NEW SYNTAX—NO SPECIAL
*                 HANDLING FOR QUOTES
*
* OTHER NOTES:
*   1. THE TERM SYNTAX INTERFACE CAN BE USED BY FILE REVISION
*      FOR CHECKING ARITHMETIC FIELD DATA, BUT MAY NOT BE
*      USED IF THE FIELD IS A CHARACTER OR TEXT FIELD. (THE
*      PROBLEM WITH A CHARACTER FIELD IS THAT LEADING SPACES
*      MAY MAKE IT AN INVALID TERM AND THE PROBLEM WITH TEXT
*      IS THAT THE CONTROLS CAN MAKE THE RESULT UNPREDICTABLE.)
*
*   2. THE SYNTAX FOR THE RECORD SELECTION FRAME IS:
*
* <EXP> ::= <NULL> | <NON-NULL EXP>
*
* <NON-NULL EXP> ::= <TERM> | <TERM><LOGICAL OPER><NON-NULL EXP> |
*                    <FILL><NON-NULL EXP><FILL>
```

```
* <LOGICAL OPER> ::= <FILL><OR><FILL> | <FILL><AND><FILL>
* <OR>  ::= 2B CONTROL DISPLAYED AS |, HALF INDEXED UP
* <AND> ::= 2B CONTROL DISPLAYED AS &, HALF INDEXED UP
* <FILL> ::= <NULL> | <SPACES>
* <NULL> ::= NO CHARACTERS
* <SPACES> ::= <SPACE> | <SPACE><SPACES>
* <SPACE> ::= THE SPACE CHARACTER (X'40')
* <TERM> ::= <FACTOR> | <COMPARE OPER><FILL><FACTOR>
* <COMPARE OPER> ::= <LT> | <GT> | <EQ> | <NE> |
*                    <LT><FILL><EQ> | <EQ><FILL><LT> |
*                    <GT><FILL><EQ> | <EQ><FILL><GT>
* <LT> ::= 2B CONTROL DISPLAYED AS <, HALF INDEXED UP
* <GT> ::= 2B CONTROL DISPLAYED AS >, HALF INDEXED UP
* <EQ> ::= 2B CONTROL DISPLAYED AS =, HALF INDEXED UP
* <NE> ::= 2B CONTROL DISPLAYED AS AN EQUALS WITH A SLASH THROUGH
*          IT, HALF INDEXED UP
* <FACTOR> ::= IF A CHARACTER FIELD, THEN  <CHARACTER FACTOR>
*              IF A NUMERIC FIELD, THEN    <NUMBER>
* <CHARACTER FACTOR> ::= <DATA STRING> | <VARIABLE LENGTH MASK>
*                        <DATA STRING><VARIABLE LENGTH MASK>
* <DATA STRING> ::= <DATA CHARACTER> | <DATA CHARACTER><DATA STRING>
* <DATA CHARACTER> ::= <ANY CHARACTER GREATER THAN X'40'> |
*                      <POSITIONAL MASK>
* <POSITIONAL MASK> ::= 2B CONTROL THAT DISPLAYS AS ..
*                       HALF INDEXED UP
* <VARIABLE LENGTH MASK> ::= 2B CONTROL THAT DISPLAYS AS ?,
*                            HALF INDEXED UP
* <NUMBER> ::= <VALUE> | <SIGN><VALUE>
* <SIGN> ::= + | -
* <VALUE> ::= <DIGITS> | <DEC PT><DIGITS> | <DIGITS><DEC PT><DIGITS> |
*             <DIGITS><DEC PT>
* <DIGITS> ::= <NUMERIC> | <NUMERIC><DIGITS>
* <NUMERIC> ::= 0 | 1 | 2 | ... | 9
* <DEC PT> ::= . | , | .
     3. REGISTER USAGE IN THE SYNTAX CHECKING ROUTINES IS:
        SI,DS = POINTER TO CURRENT POSITION IN STRING
        ES = DS, SO DI,ES CAN BE USED FOR STRING OPERATIONS
        AX = GENERAL USE
        BX = POINTER TO FIRST BYTE AFTER THE STRING
        CX = LOOP COUNTER (REPSTRNG)
        DX : DL = FLAG BYTE:
             .... ...1 = TABLE SEARCH BIT (LDARTAB)
                         USED IN ARITHMETIC CHECK
                         0 = NO MATCH FOUND IN TABLE
                         1 = MATCH FOUND
             .... ..1. = EXPRESSION CHECKED BIT (LDEXPCHK)
                         USED FOR LOOP CONTROL
                         0 = EXPRESSION CHECK IS NOT FINISHED
                         1 = FINISHED
             .... .1.. = LOGICAL OPERATOR FOUND BIT (LDLOGOP)
                         USED TO INDICATE IF A LOGICAL OPERATOR
                         HAS BEEN FOUND
                         0 = LOGICAL OPERATOR NOT FOUND
                         1 = FOUND
             .... 1... = COMPARISON OPERATOR FOUND BIT (LDCOMPF)
                         USED TO FLAG WHEN A COMPARISON OPERATOR
                         HAS BEEN FOUND
                         0 = COMPARISON OPERATOR NOT FOUND
                         1 = FOUND
             ...1 .... = END OF SCAN BIT (LDCSCAN)
                         USED TO CONTROL THE SCAN LOOP FOR
                         CHARACTER STRING SCAN
                         0 = NOT FINISHED SCANNING
                         1 = FINISHED
        DH = RETURN CODE
*************-END-OF-SPECIFICATIONS-****************************
*/                      BEGIN (KEYSTROKE ERROR CHECK)
*/                      1. IF TYPE OF CHECK IS 'KEYSTROKE' THEN
*/                      2. . SET RETURN CODE TO 'VALID'
* SET WHEN DX CLEARED   2. . IF THE CODE IS NOT A 'GRAPHIC' (BELOW
*/                              X'40') THEN
*C
```

```
*/                                       3. . . SET RETURN CODE TO 'INVALID'              00317000
*/                                       2. . ELSE (IT IS A GRAPHIC)                      00319000
*/                                       3. . . IF THE FIELD IS ARITHMETIC THEN           00321000
*/                                       4. . . . SEARCH THE TABLE FOR A MATCH            00323000
*/                                       4. . . . IF NO MATCH FOUND THEN                  00333000
*/                                       5. . . . . SET RETURN CODE TO 'INVALID'          00335000
*/                                       4. . . . ENDIF (NO MATCH)                        00337000
*/                                       4. . . . IF RESULT IS INVALID THEN               00337250
*/                                       5. . . . . DISPLAY ERROR MESSAGE                 00337500
*/                                       4. . . . ENDIF                                   00337875
*/                                       3. . . ENDIF (FIELD IS ARITHMETIC)               00339000
*/                                       2. . ENDIF (NOT A GRAPHIC)                       00341000
*/                                       1. ELSE (NOT KEYSTROKE CHECK)                    00343000
*/                                       2. . SET RESULT TO 'VALID'                       00346000
* DONE WHEN OX CLEARED ABOVE
*/                                       2. . IF THE TYPE OF CHECK IS 'EXPRESSION         00350000
*C                                              CHECK' THEN                               00351000
*/                                       3. . . IF THE EXPRESSION IS NOT NULL THEN        00353000
*/                                       4. . . . UNTIL EXPRESSION CHECKED OR END OF      00355000
*C                                              STRING DO                                 00356000
*/                                       5. . . . . SKIP ANY PRECEEDING 'FILL'            00361000
*/                                       5. . . . . CHECK FOR A TERM (TERM CHECK)         00363000
*/                                       5. . . . . IF TERM IS OK THEN                    00365000
*/                                       6. . . . . . CHECK FOR A LOGICAL OPERATOR        00367000
*/                                       6. . . . . . BEGIN CHECK FOR LOGICAL             00368000
*C                                              OPERATOR                                  00369000
*//                                      7. . . . . . . SKIP 'FILL'                       00370000
*C                                       7. . . . . . . SET INDICATOR TO SHOW             00372000
*//                                            LOGICAL OPERATOR NOT FOUND                 00373000
*C                                       7. . . . . . . IF NOT AT END OF STRING THEN      00375000
*//                                      8. . . . . . . . IF THE NEXT CHARACTER IS        00377000
*C                                              THE BEGINNING OF A                        00378000
*//                                             CONTROL (X'2B') THEN                      00379000
*C                                       9. . . . . . . . . IF IT IS AN 'OR' OR           00382000
*//                                             'AND' CONTROL THEN                        00383000
*C                                       10. . . . . . . . . . SET INDICATOR TO SHOW      00390000
*C                                              LOGICAL OPERATOR                          00391000
*C                                              FOUND                                     00392000
*//                                      10. . . . . . . . . . SKIP 'FILL'                00395000
*//                                      9. . . . . . . . . ENDIF ('OR' OR 'AND')         00397000
*//                                      8. . . . . . . . ENDIF (CONTROL)                 00399000
*//                                      7. . . . . . . ENDIF (NOT AT END OF STRING)      00401000
*C                                       6. . . . . . END CHECK FOR LOGICAL OPERATOR      00403000
*C                                       6. . . . . . IF NO LOGICAL OPERATOR FOUND        00404000
*C                                              THEN                                      00405000
*C                                       7. . . . . . . SET RESULT TO 'VALID              00407000
*C                                              EXPRESSION'                               00408000
* ALREADY VALID IF TERM IS OK                                                             00409000
*/                                       7. . . . . . . SKIP 'FILL'                       00410000
* ALREADY CHECKED WHEN CHECKING FOR AN OPERATOR                                           00411000
*/                                       7. . . . . . . IF MORE DATA LEFT IN THE          00412000
*C                                              CHARACTER STRING THEN                     00413000
*/                                       8. . . . . . . . SET RESULT TO 'INVALID          00415000
*C                                              EXPRESSION'                               00416000
*/                                       7. . . . . . . ENDIF (MORE DATA LEFT)            00419000
*C                                       6. . . . . . ELSE                                00419200
*/                                       7. . . . . . . IF AT THE END OF THE STRING       00419400
*C                                              THEN                                      00419500
*/                                       8. . . . . . . . SET RESULT TO INVALID           00419700
*/                                       7. . . . . . . ENDIF                             00419900
*C                                       6. . . . . . ENDIF (NO LOGICAL OPERATOR          00421000
*C                                              FOUND)                                    00422000
*C                                       5. . . . . ELSE (TERM NOT OK)                    00424000
*C                                       6. . . . . . SET RESULT TO 'INVALID              00426000
*C                                              EXPRESSION'                               00427000
*C                                       5. . . . . ENDIF (TERM IS OK)                    00430000
*/                                       4. . . . ENDDO UNTIL (EXPRESSION CHECKED OR      00432000
*C                                              END OF STRING)                            00433000
*C                                       3. . . ENDIF                                     00435000
*/                                       2. . ELSE (TYPE OF CHECK IS 'TERM')              00437000
*/                                       3. . . CHECK FOR A TERM (TERM CHECK)             00439000
*/                                       3. . . IF VALID BUT END OF STRING NOT            00441000
*//                                             REACHED THEN                              00442000
*C                                       4. . . . SET THE RETURN INVALID                  00445000
*//                                      3. . . ENDIF (END OF STRING NOT REACHED)         00447000
*/                                       2. . ENDIF (TYPE OF CHECK IS EXPRESSION)         00449000
*/                                       1. ENDIF (TYPE OF CHECK IS KEYSTROKE)            00451000
*/                                       1. RETURN TO CALLER                              00453000
*/                                       END (KEYSTROKE ERROR CHECK)                      00457000
******************************************************************                        00459000
*                                             SKIP FILL                                * 00460000
*                                             SKIPFILL                                 * 00461000
******************************************************************                        00462000
*                                                                                      * 00463000
* FUNCTION: THIS IS A SUBROUTINE TO SKIP ANY SPACES                                     * 00464000
*           BEGINNING AT THE LOCATION POINTED TO BY                                     * 00465000
*           THE CURRENT POINTER AND ENDING AFTER A                                      * 00466000
*           NON-SPACE IS FOUND OR THE END OF STRING                                     * 00467000
*           IS REACHED.                                                                 * 00468000
*                                                                                      * 00469000
*/                                            BEGIN (SKIP FILL)                           00493000
*/                                            1. IF THERE IS DATA TO SKIP THEN            00494000
*/                                            2. . SCAN PAST NON-SPACES                   00496000
*/                                            2. . IF A NON-SPACE IS FOUND THEN           00502000
*/                                            3. . . BACK POINTER UP TO IT                00504000
*/                                            2. . ENDIF (NON-SPACE FOUND)                00506000
```

```
*/                              1. ENDIF (DATA TO SKIP)                00509000
*/                                 END (SKIP FILL)                     00511000
*xxxxxxxxxxxxxxxxxxxxxxxxxxxxxxxxxxxxxxxxxxxxxxxxxxxxxxxxxxxxxxxxxxx   00514000
*x                              TERM CHECK                         *   00515000
*x                                 TERMCHK                         *   00516000
                                   BEGIN (TERM CHECK)                  00577000
*/                              1. IF THE TERM IS NULL THEN            00579000
*/                              2. . SET RESULT TO 'INVALID'           00581000
*/                              1. ELSE                                00583000
*/                              2. . CHECK FOR A COMPARISON OPERATOR   00585000
*/                              2. . BEGIN CHECK FOR COMPARISON OPERATOR 00586000
*/                              3. . . CLEAR 'COMPARISON OPERATOR FOUND' 00588000
*E                                      FLAG                           00589000
*/                              3. . . IF THE NEXT CHARACTER IS THE    00591000
*E                                      BEGINNING OF A 'QLD' CONTROL   00592000
*E                                      (X'28') THEN                   00593000
*/                              4. . . . IF IT IS A 'NE' CONTROL THEN  00598000
*/                              5. . . . . SET POINTER PAST IT         00600000
*/                              5. . . . . SET 'COMPARISON OPERATOR FOUND' 00602000
*E                                          FLAG                       00603000
*/                              4. . . . ELSE ('NE' NOT FOUND)         00605000
*/                              5. . . . . IF IT IS 'GT' OR 'LT' THEN  00607000
*/                              6. . . . . . SET 'COMPARISON OPERATOR  00610000
*E                                            FOUND' FLAG              00611000
*/                              6. . . . . . SET POINTER PAST IT       00613000
*/                              6. . . . . . FIND THE END OF FILL AFTER IT 00615000
*/                              6. . . . . . IF ANOTHER CONTROL FOLLOWS AND 00618000
*/                                            IT IS 'EQ' THEN          00619000
*/                              7. . . . . . . SET POINTER PAST IT     00626000
*/                              6. . . . . . . ENDIF (FOLLOWING 'EQ')  00630000
*/                              5. . . . . ELSE ('GT' OR 'LT' NOT FOUND) 00633000
*/                              6. . . . . . IF IT IS 'EQ' THEN        00635000
*/                              7. . . . . . . SET 'COMPARISON OPERATOR 00637000
*E                                              FOUND' FLAG            00638000
*/                              7. . . . . . . SET POINTER PAST IT     00640000
*/                              7. . . . . . . FIND THE END OF FILL AFTER 00642000
*E                                              IT                     00643000
*/                              7. . . . . . . IF ANOTHER CONTROL FOLLOWS 00646000
*E                                              AND IT IS 'GT' OR 'LT' 00647000
*E                                              THEN                   00648000
*/                              8. . . . . . . . SET POINTER PAST IT   00656000
*/                              7. . . . . . . ENDIF (FOLLOWING 'GT' OR 00660000
*E                                              'LT')                  00661000
*/                              6. . . . . . ENDIF ('EQ')              00664000
*/                              5. . . . . ENDIF ('GT' OR 'LT')        00666000
*/                              4. . . . ENDIF ('NE')                  00668000
*/                              3. . . ENDIF (NEXT CHARACTER IS BEGINNING 00670000
*E                                      OF CONTROL)                    00671000
*/                              2. . END CHECK FOR COMPARISON OPERATOR 00673000
*/                              2. . IF A COMPARISON OPERATOR IS FOUND THEN 00674000
*/                              3. . . SKIP 'FILL'                     00676000
*/                              2. . ENDIF (COMPARISON OPERATOR FOUND) 00678000
*/                              2. . SET RETURN TO SHOW TERM IS VALID  00680000
*/ ASSUMED SET TO 'VALID' AS PART OF THE SUBROUTINE INPUT              00681000
*/                              2. . TEST FOR A FACTOR                 00682000
*/                              2. . BEGIN (TEST FOR A FACTOR)         00683000
*/                              3. . . IF THE FACTOR IS NULL THEN      00684000
*/                              4. . . . SET RESULT TO INVALID         00686000
*/                              3. . . ELSE                            00688000
*/                              4. . . . IF THE FIELD TYPE IS ARITHMETIC 00690000
*E                                        THEN                         00691000
*/                              5. . . . . CHECK FOR VALID NUMBER SYNTAX 00693000
*xxxxxxxxxxxxxxxxxxxxxxxxxxxxxxxxxxxxxxxxxxxxxxxxxxxxxxxxxxxxxxxxxxxx  00695000
*/                              5. . . . . BEGIN (CHECK FOR VALID NUMBER 00729000
*E                                          SYNTAX)                    00730000
*/                              6. . . . . . IF THE FIRST CHARACTER IS A 00732000
*E                                            SIGN THEN                00733000
*/                              7. . . . . . . SKIP OVER IT            00737000
*/                              6. . . . . . ENDIF (FIRST CHARACTER IS A 00739000
*E                                            SIGN)                    00740000
*/                              6. . . . . . SKIP ALL DIGIT CHARACTERS 00742000
*/                              6. . . . . . IF THERE ARE MORE CHARACTERS 00750000
*E                                            THEN                     00751000
*/                              7. . . . . . . IF THE NEXT CHARACTER IS A 00753000
*E                                              DECIMAL POINT THEN     00754000
*/                              8. . . . . . . . SKIP THE DECIMAL POINT 00759000
*/                              8. . . . . . . . IF A DIGIT HAS NOT BEEN 00761000
*E                                                FOUND AND THE NEXT   00762000
*E                                                CHARACTER IS NOT A DIGIT 00763000
*E                                                OR THERE ARE NO MORE 00764000
*E                                                CHARACTERS THEN      00765000
*/                              9. . . . . . . . . SET RETURN TO SHOW AN 00771000
*E                                                  INVALID TERM       00772000
*/                              8. . . . . . . . ELSE                  00774000
*/                              9. . . . . . . . . SKIP ALL DIGIT      00776000
*E                                                  CHARACTERS         00777000
*/                              8. . . . . . . . ENDIF                 00784000
*/                              7. . . . . . . ELSE (NOT A DECIMAL POINT) 00786000
*/                              8. . . . . . . . IF A DIGIT HAS NOT BEEN 00788000
*E                                                FOUND THEN           00789000
*/                              9. . . . . . . . . SET THE RETURN TO SHOW 00791000
*E                                                  AN INVALID TERM    00792000
*/                              8. . . . . . . . ENDIF                 00794000
*/                              7. . . . . . . ENDIF (NEXT CHARACTER IS A 00796000
*E                                              DECIMAL POINT)         00797000
*/                              6. . . . . . ELSE (THERE ARE NO MORE   00799000
*E                                            CHARACTERS)              00800000
```

```
*//                          7. . . . . . . . IF A DIGIT HAS NOT BEEN                  00802000
*&                                              FOUND THEN                              00803000
*//                          8. . . . . . . . SET RETURN TO SHOW AN                    00805000
*&                                              INVALID TERM                            00806000
*//                          7. . . . . . . ENDIF                                       00810000
*//                          6. . . . . . ENDIF (MORE CHARACTERS)                       00811000
*//                          5. . . . . END (CHECK FOR VALID NUMBER                     00812000
*&                                          SYNTAX)                                     00813000
*/                           4. . . . ELSE (FIELD TYPE IS CHARACTER, NOT                00826000
*&                                       ARITHMETIC)                                    00827000
*/                           5. . . . . CHECK FOR A <CHARACTER STRING>                  00829000
*&                                       (CHCSQCS)                                      00830000
*/                           4. . . . ENDIF (FIELD TYPE IS ARITHMETIC)                  00851000
*/                           3. . . ENDIF (FACTOR IS NULL)                              00853000
*/                           2. . END (TEST FOR A FACTOR)                               00855000
*/                           1. ENDIF (TERM IS NULL)                                    00856000
*/                           1. RETURN TO CALLER                                        00858000
*/                              END (TERM CHECK)                                        00859000
*******************************************************************                    00862000
*                         CHECK FOR CHARACTER STRING                  *                 00863000
*                               CHCSQCS                               *                 00864000
*******************************************************************                    00865000
*                                                                     *                 00866000
*    FUNCTION: THIS SUBROUTINE WILL SCAN CHARACTERS LOOKING            *                00867000
*              FOR THE END OF A <CHARACTER STRING>.                    *                00868000
*              THE INPUT POINTER IS ASSUMED TO BE A NON-SPACE          *                00869000
*              CHARACTER THAT IS THE FIRST CHARACTER OF THE            *                00871000
*              <CHARACTER FACTOR>.                                     *                00872000
*                                                                     *                 00878000
*              THE RULES FOR ENDING THE SCAN ARE:                      *                00879000
*                  FOR <CHARACTER STRING>: AT THE END OF STRING,       *                00880000
*                      AFTER A VARIABLE LENGTH MASK,                   *                00881000
*                      OR AFTER A CONTROL THAT IS NOT                  *                00882000
*                      A MASK.                                         *                00883000
*                                                                     *                 00889000
*/                           BEGIN (CHECK FOR CHARACTER STRING)                         00970000
*/                           1. SET RESULT TO VALID                                     00973000
*  ASSUMED SET VALID AS PART OF THE INPUT                                               00974000
*/                           1. UNTIL END OF SCAN (FLAG) OR END OF                      00977000
*&                              STRING DO                                               00978000
*/                           2. . IF THE CHARACTER IS A CONTROL THEN                    00984000
*/                           3. . . IF IT IS A POSITIONAL MASK THEN                     01010000
*/                           4. . . . SET POINTER PAST IT                               01016000
*/                           3. . . ELSE (NOT A POSITIONAL MASK OR SPACE                01018000
*&                                    INDICATOR)                                        01018500
*/                           4. . . . SET 'END OF SCAN' FLAG                            01020000
*/                           4. . . . IF IT IS A VARIABLE LENGTH MASK                   01022000
*&                                       THEN                                           01023000
*/                           5. . . . . SET POINTER PAST IT                             01029000
*/                           4. . . . ELSE (NOT A RECOGNIZED CONTROL)                   01031000
*/                           5. . . . . SET POINTER TO IT                               01045000
*/                           4. . . . ENDIF (A VARIABLE LENGTH MASK)                    01057000
*/                           3. . . ENDIF (A POSITIONAL MASK)                           01059000
*/                           2. . ENDIF (CHARACTER IS A CONTROL)                        01061000
*/                           1. ENDDO UNTIL (END OF SCAN OR END OF                      01065000
*&                              STRING)                                                 01066000
*/                           1. IF RESULT IS VALID THEN                                 01068000
*/                           2. . MOVE POINTER BACK TO THE BEGINNING OF                 01073000
*&                                   ANY TRAILING SPACES                                01074000
*/                           1. ENDIF (VALID)                                           01080000
*/                           1. RETURN TO CALLER                                        01092000
*/                              END (CHECK FOR CHARACTER STRING OR QUOTED               01093000
*&                                  CHARACTER STRING)                                   01094000
*******************************************************************                    01097000
*                        ARITHMETIC CHARACTER TABLE                   *                 01098000
*******************************************************************                    01099000
*******************************************************************                    01118000
*                             LOCAL EQUATES                           *                 01119000
*******************************************************************                    01120000
*//                              DSECTS                                                 01141000
*) COMMENTS RIGHT                                                                       00005000
********************-START-OF-SPECIFICATIONS-***********************                    00006000
*                                                                     *                 00007000
* PROGRAM NAME: PQLTSTR                                               *                 00008000
*                                                                     *                 00009000
* DESCRIPTIVE NAME: QUALIFY TEST RECORD                               *                 00010000
*                                                                     *                 00011000
* COPYRIGHT: XXXX-XXX (C) COPYRIGHT IBM CORPORATION 1980              *                 00012000
*            LICENSED MATERIAL - PROGRAM PROPERTY OF IBM              *                 00013000
*            REFER TO COPYRIGHT INSTRUCTIONS FORM NO. G120-2083       *                 00014000
*                                                                     *                 00015000
* STATUS: RELEASE R52, COMPONENT RCL, VERSION 00.01                   *                 00016000
*                                                                     *                 00017000
* FUNCTION:                                                           *                 00018000
*     THE QUALIFICATION PARAMETERS IN THE QUALIFY CONTROL BLOCK        *                00019000
*     ARE SCANNED AND EVALUATED FOR THE CURRENT RECORD ACCESSED        *                00020000
*     BY THE FILE MANAGER. THE ROWS ARE EVALUATED UNTIL A ROW IS       *                00021000
*     EVALUATED 'TRUE' FOR THE RECORD OR ALL ROWS ARE EVALUATED        *                00022000
*     'FALSE'. IF A ROW IS FOUND THAT EVALUATES 'TRUE', THEN THE       *                00023000
*     RECORD QUALIFIES. EACH ROW IS DIVIDED INTO 'ELEMENTS',           *                00024000
*     EACH OF WHICH IS THE EXPRESSION CONTAINED IN A COLUMN OF         *                00025000
*     THE TABLE FOR THAT PARTICULAR ROW. THE ELEMENTS FOR EACH         *                00026000
*     ROW ARE EVALUATED UNTIL AN ELEMENT IS EVALUATED 'FALSE' OR       *                00027000
*     ALL ELEMENTS ARE EVALUATED 'TRUE'. IF AN ELEMENT IS              *                00028000
*     EVALUATED 'FALSE' THEN THE ROW IS GIVEN A 'FALSE'                *                00029000
*     EVALUATION. IF ALL ELEMENTS IN THE ROW ARE EVALUATED             *                00030000
*     'TRUE' THEN THE ROW IS EVALUATED 'TRUE'. THIS ALGORITHM          *                00031000
*     FOR EVALUATING THE ELEMENTS IS AN 'OR' OF ALL ROWS AND AN        *                00032000
*     'AND' OF ALL ELEMENTS IN A ROW TO DETERMINE WHETHER A            *                00033000
*     RECORD QUALIFIES.                                               *                 00034000
```

```
* NOTES:
*   DEPENDENCIES:
*   RESTRICTIONS:
*   REGISTER CONVENTIONS: STANDARD PANTHER REGISTER CONVENTIONS
* PROGRAM TYPE: PROCEDURE
*   PROCESSOR: 370 HOSTED 8086 ASSEMBLER
*   PROGRAM SIZE: 127 LOC / 331 BYTES
*   ATTRIBUTES: REENTRANT
* ENTRY POINT: RQLTSTR
*   LINKAGE:
*        PUSH (SEGMENT POINTER TO SCRATCH BUFFER)
*        PUSH (OFFSET POINTER TO SCRATCH BUFFER)
*        INVOKE RQLTSTR
*        AI   SP,4   (TRASH INPUT)
* INPUT:
*        - SP POINTS TO THE EXPLICIT STACK PASSED PARAMETERS. THE
*          FOLLOWING LIST GIVES THE OFFSETS FROM SP OF THE
*          PARAMETERS:
*          0 - 4-BYTE POINTER TO THE USER SUPPLIED SCRATCH BUFFER
*        - DS POINTS TO THE AVT
*        - SS POINTS TO THE PCB
* OUTPUT:
*        - RETURN/REASON CODE IN AX
* EXIT-NORMAL:
*      RETURN CODES
*           0 - RECORD QUALIFIES
*           2 - RECORD DOES NOT QUALIFY
*
*      REASON CODES
*           0 -- /0  NO QUALIFIERS EXIST
*              -- /2  A RECORD QUALIFIES WITH EXISTING QUALIFIERS
* EXIT-ERROR: NONE
* EXTERNAL REFERENCES:
*   ROUTINES:
*      RQLCHCRT - CHECK CRITERIA
*      RFMGFELD - GET POINTERS AND LENGTHS TO FIELDS
*      RFMRDFAT - GET FIELD ATTRIBUTES
*   DATA AREAS:
*     CONTROL BLOCKS:
*       CONTROL BLOCKS REFERENCED:
```

| CNTL BLK | FIELD NAME | BIT(S) NAME | DESCRIPTION |
|---|---|---|---|
| IAVT | | | APPLICATION VECTOR TABLE |
| | RAVTQCB | | SEGMENT POINTER TO THE QUALIFY CONTROL BLOCK |
| | RAVTFMCB | | SEGMENT POINTER TO THE FILE MANAGER CONTROL BLOCK |
| QCB | | | QUALIFY CONTROL BLOCK |
| | RQLQNFLS | | NUMBER OF FIELDS IN LIST |
| | RQLQLQDT | | LENGTH OF QUALIFICATION DATA |
| | PQLQFLST | | FIELD LIST |
| | RQLQQDAT | | QUALIFICATION DATA |

```
*       CONTROL BLOCKS MODIFIED:
```

| CNTL BLK | FIELD NAME | BIT(S) NAME | DESCRIPTION |
|---|---|---|---|
| FMCB | | | FILE MANAGER CONTROL BLOCK |
| | RFMCBNFL | | NUMBER OF FIELDS IN LIST |
| | RFMCBLFN | | OFFSET POINTER TO FIELD NUMBER LIST |
| | RFMCBLFS | | SEGMENT POINTER TO FIELD NUMBER LIST |
| | RFMCBLFA | | POINTER TO LIST OF FIELD ATTRIBUTES |
| | RFMCBLFV | | POINTER TO FIELD VALUE/NAME LIST |
| | RFMCBLSG | | SEGMENT POINTER TO RFMCBLFA, RFMCBLFV |

```
* TABLES: NONE
* MACROS: NONE
* CHANGE ACTIVITY:
*      03/02/81.   RECORD SELECTION INTEGRITY IS NOT PRESERVED
*                  WHEN COLUMNS ARE MOVED IN THE QUALIFY FRAME.
*******************-END-OF-SPECIFICATIONS-*******************
```

```
BEGIN (TEST RECORD)
1.   INITIALIZE THE FLAG BYTE
1.   SET RETURN CODE TO 'SUCCESS' (REASON =
       NO QUALIFIERS)
1.   CALCULATE THE END OF THE QUALIFICATION
       DATA
1.   IF VALUE LIST IS NOT EMPTY THEN
2.   . THE LAST ENTRY CONTAINS ONLY THE THE
         LENGTH BYTES AND SINCE THE POINTER
         TO THE LAST ROW VECTOR IS DESIRED,
         CX NEEDS TO BE COMPENSATED BY THIS
         AMOUNT
2.   . INVOKE THE FILE MANAGER TO GET THE
         POINTERS AND LENGTHS TO FIELDS INTO
         THE SUPPLIED SCRATCH BUFFER
         (RFMGFELD)
2.   . SET UP THE ENTRIES IN THE FILE MANAGER
         CONTROL BLOCK
2.   . USE SI AS THE ROW POINTER, DI AS THE
         FIELD POINTER
2.   . UNTIL THE TEST IS DONE DO
3.   . . IF ALL ROWS ARE NOT CHECKED THEN
4.   . . . I.E. IF THE CURRENT ROW POINTER IS
             NOT AT THE END OF THE
             QUALIFICATION DATA
4.   . . . COMPUTE THE POINTER TO THE NEXT
             ROW
4.   . . . SET CURRENT FIELD POINTER TO THE
             FIRST FIELD IN THE ROW
4.   . . . UNTIL ALL THE QUALIFICATION FIELDS
             ENTERED FOR THAT ROW ARE CHECKED
             OR A FIELD IN THE ROW FAILS DO
5.   . . . . GET THE FIELD NUMBER INTO LOCAL
               STORAGE USE THE COLUMN NUMBER
               AS INDEX INTO THE FIELD LIST
5.   . . . . INVOKE THE FILE MANAGER TO GET
               THE FIELD ATTRIBUTES
               (RFMRDFAT)
5.   . . . . SET UP THE CONTROL BLOCK ENTRIES
               IN THE FMCB
5.   . . . . INVOKE CHECK CRITERIA (RULCHCRT)
5.   . . . . IF THE FIELD CHECKS OK THEN
6.   . . . . . SKIP TO THE NEXT FIELD
6.   . . . . . BUMP THE CURRENT FIELD POINTER
                 BY THE LENGTH OF THE FIELD
6.   . . . . . IF THIS ROW IS DONE THEN
7.   . . . . . . I.E. IF THE CURRENT FIELD
                   POINTER COINCIDES WITH THE
                   POINTER TO THE NEXT ROW
7.   . . . . . . SET TEST RESULT TO 'SUCCESS'
                   (REASON = RECORD QUALIFIES
                   WITH EXISTING QUALIFIERS)
7.   . . . . . . TEST IS DONE, SET FLAG
6.   . . . . . ENDIF
5.   . . . . ELSE (FIELD DOES NOT CHECK OK)
6.   . . . . . ROW FAILS, SET FLAG
5.   . . . . ENDIF
4.   . . . ENDDO UNTIL
3.   . . ELSE (ALL ROWS CHECKED)
4.   . . . SET RETURN CODE TO 'FAIL'
4.   . . . TEST IS DONE
3.   . . ENDIF
2.   . ENDDO UNTIL
1.   ELSE (NO QUALIFIERS)
2.   . SET RETURN CODE TO SUCCESS (REASON =
         NO QUALIFIERS)
1.   ENDIF
1.   RETURN TO CALLER
END (TEST RECORD)
LOCAL STORAGE AND LOCAL EQUATES
OTHER CSECTS
```

*) COMMENTS RIGHT
********************-START-OF-SPECIFICATIONS-********************

* PROGRAM NAME: RULCHCRT
*
* DESCRIPTIVE NAME: CHECK CRITERIA
*
* COPYRIGHT: XXXX-XXX (C) COPYRIGHT IBM CORPORATION 1980
*            LICENSED MATERIAL - PROGRAM PROPERTY OF IBM
*            REFER TO COPYRIGHT INSTRUCTIONS FORM NO. G120-2083
*
* STATUS: RELEASE RS2, COMPONENT RUL, VERSION 00.01
*
* FUNCTION:
*     THE QUALIFY CONDITION IS EVALUATED LEFT TO RIGHT WITH 'AND'
*     TAKING PRECEDENCE OVER 'OR'. BETWEEN LOGICAL OPERATORS
*     THERE IS A COMPARISON OPERATOR AND A CONSTANT. THE
*     COMPARISON OPERATOR IS AN IMPLIED '=' IF NOT PRESENT. THE
*     CHARACTER STRING COMPARE OR ARITHMETIC COMPARE IS CALLED TO
*     MAKE THE COMPARISON (DEPENDING ON THE FIELD TYPE). A TRUE
*     RESULT FOLLOWED BY AN 'OR' RESULTS IN THE TEST BEING TRUE.
*     A FALSE RESULT FOLLOWED BY AN 'AND' CAUSES THE COMPARISON
*     FOLLOWING THE NEXT 'OR' TO BE TESTED. A FALSE RESULT
*     FOLLOWED BY 'OR' OR A TRUE RESULT FOLLOWED BY 'AND' CAUSES
*     THE COMPARISON AFTER THAT LOGICAL OPERATOR TO BE TESTED.

```
*  NOTES:
*    DEPENDENCIES:
*    RESTRICTIONS:
*    REGISTER CONVENTIONS: STANDARD PANTHER REGISTER CONVENTIONS
*  PROGRAM TYPE: PROCEDURE
*    PROCESSOR: 370 HOSTED 8086 ASSEMBLER
*    PROGRAM SIZE:  190  LOC/  456  BYTES
*    ATTRIBUTES: REENTRANT
*  ENTRY POINT: RQLCHCRT
*    LINKAGE: INVOKE
*  INPUT:
*             - BP POINTS TO EXPLICIT STACK PASSED PARAMETERS. THE
*               FOLLOWING LIST GIVES THE OFFSET FROM BP AND THE
*               PARAMETER:
*                  OFFSET 0 -  1 BYTES: FIELD ATTRIBUTES (LOW BYTE
*                                       OF PUSH)
*                         1 -  1         EXTRA BYTE (DON'T CARE)
*                         2 -  2         FIELD LENGTH
*                         4 -  2         POINTER   TO   FIELD   VALUE
*                                        (ADDRESS)
*                         6 -  2         POINTER   TO   FIELD   VALUE
*                                        (SEGMENT)
*                         8 -  2         LENGTH OF QUALIFY CONDITION
*                        10 -  2         POINTER TO QUALIFY CONDITION
*                                        (ADDRESS)
*                        12 -  2         POINTER TO QUALIFY CONDITION
*                                        (SEGMENT)
*  OUTPUT:
*             - RETURN CODE IN AL.
*             - REASON CODE IN AH.
*
*  EXIT-NORMAL:
*    RETURN CODES
*
*             0 - SUCCESSFUL, RESULT IS TRUE
*             2 - SUCCESSFUL, RESULT IS FALSE
*
*    REASON CODES
*             NONE.
*  EXIT-ERROR: NONE
*  EXTERNAL REFERENCES:
*    ROUTINES:
*
*       SUBORDINATE ROUTINES
*         RQLCSCMP - CHARACTER STRING COMPARE
*         RQLARCMP - ARITHMETIC COMPARE
*         RQLKERCH - USED  TO  ACCESS  A  TERM  OF  THE  QUALIFYING
*                    CONDITION
*
*    DATA AREAS:
*       NONE.
*    CONTROL BLOCKS:
*       CONTROL BLOCKS REFERENCED:
*         NONE.
*
*       CONTROL BLOCKS MODIFIED:
*         NONE.
*  TABLES:
*       NONE.
*  MACROS:
*       NONE.
*
*  CHANGE ACTIVITY:
*       1. 03/11/81 - FIX PROBLEM OF CALLING RQLKERCH WITH
*                     SPACES NOT SKIPPED.
*  NOTES:    1. 'QLO' IS AN ABBREVIATION FOR 'QUERY LOGIC OPERATOR'.
*               THIS IS THE CONTROL USED FOR GT,LT,EQ,NE,'AND','OR',
*               AND THE TWO MASKING CHARACTERS.
```

```
*       2. REGISTER USAGE IS:                                              *  00127000
*          DI,ES = POINTS TO THE CURRENT LOCATION BEING                    *  00128000
*                  PROCESSED IN THE QUALIFY CONDITION.                     *  00129000
*          SI,ES = POINTS TO THE BYTE PAST THE QUALIFY                     *  00130000
*                  CONDITION.                                              *  00131000
*          DL    = FLAG THAT INDICATES THE COMPARISON RESULT               *  00132000
*                  FROM THE ARITHMETIC OR CHARACTER STRING                 *  00133000
*                  COMPARE.  THIS IS BIT ENCODED AS:                       *  00134000
*                  .... ...1 = SET WHEN B LT A                             *  00135000
*                  .... ..1. = SET WHEN B EQ A                             *  00136000
*                  .... .1.. = SET WHEN B GT A                             *  00137000
*                  WHERE "B" IS THE FIELD VALUE FROM THE RECORD            *  00138000
*                  AND "A" IS THE CONSTANT FROM THE QUALIFING              *  00139000
*                  CONDITION.                                              *  00140000
*          DH    = COMPARISON CONDITION INDICATING THE TEST                *  00141000
*                  BEING PERFORMED.  THE CONDITION IS BIT                  *  00142000
*                  ENCODED THE SAME AS DL.                                 *  00143000
*          BL    = LOGICAL OPERATOR FLAG TO INDICATE THAT THE              *  00144000
*                  LAST OPERATOR FOUND WAS 'AND' (=1) OR                   *  00145000
*                  'OR' (=0).                                              *  00146000
*          BH    = RETURN RESULT TO BE USED AS THE RETURN                  *  00147000
*                  CODE. (0 = TRUE, 1 = FALSE).                            *  00148000
*                                                                          *  00149000
************************-END-OF-SPECIFICATIONS-****************************   00150000
                         BEGIN (CHECK CRITERIA)                               00194000
*/                    1.   SET THE RETURN CODE TO TRUE                        00198000
*/                    1. IF THE QUALIFICATION CONDITION IS NOT                00200000
*6                         EMPTY THEN                                         00201000
*/                    2. . SET UP POINTERS TO SCAN THE                        00203000
*6                         QUALIFICATION CONDITION                            00204000
*/                    2. . UNTIL THE END OF QUALIFICATION                     00206000
*6                         CONDITION IS REACHED OR UNTIL THE                  00207000
*6                         NEXT LOGICAL OPERATOR IN THE                       00208000
*6                         QUALIFICATION CONDITION IS AN 'OR'                 00209000
*6                         AND THE RETURN CODE IS TRUE DO                     00210000
*/                    3. . . ACCESS THE NEXT TERM (RQLKERCH)                  00215000
*/                    3. . . DETERMINE THE COMPARISON OPERATOR                00217000
*//                   3. . . BEGIN DETERMINE THE COMPARISON                   00218000
                               OPERATOR                                       00219000
*//                   4. . . . SKIP ANY FILL BEFORE DATA                      00221000
                               (SKIPFILL)                                     00222000
*6                    4. . . . CHECK FOR A COMPARISON QLO                     00224000
                               (TCLOCOMP)                                     00225000
*/                    4. . . . IF THE FIRST PART OF THE DATA IS A             00227000
*/                             COMPARISON OPERATOR QLO THEN                   00228000
*/                    5. . . . . PROCESS THE COMPARISON QLO                   00230000
*/                    5. . . . . CHECK FOR A COMPARISON QLO                   00232000
*6                             (TQLOCOMP)                                     00233000
*/                    5. . . . . IF THE NEXT DATA IS A COMPARISON             00235000
*/                               OPERATOR QLO THEN                            00236000
*6                    6. . . . . . PROCESS THE COMPARISON QLO                 00238000
*//                   5. . . . . ENDIF NEXT IS COMP QLO                       00240000
*//                   4. . . . ELSE FIRST IS NOT A COMP QLO                   00242000
*//                   5. . . . . UPDATE THE CONDITION WITH                    00244000
*//                              'EQUALS'                                     00245000
*//                   4. . . . ENDIF FIRST IS A COMP QLO                      00247000
*//                   3. . . END DETERMINE THE COMPARISON                     00249000
                               OPERATOR                                       00250000
*// SET UP COMMON INPUT TO COMPARISON ROUTINES                                00251000
                      3. . . IF THE FIELD TYPE IS CHARACTER THEN              00262000
*/                    4. . . . INVOKE CHARACTER STRING COMPARE                00264000
*6                             (RQLCSCMP)                                     00265000
*/                    3. . . ELSE                                             00271000
*/                    4. . . . INVOKE ARITHMETIC COMPARE                      00273000
*6                             (RQLARCMP)                                     00274000
*/                    3. . . ENDIF                                            00278000
*// COMMON CLEANUP AFTER COMPARISON ROUTINES                                  00279000
*/                    3. . . USE COMPARISON OPERATOR AND RESULT               00282000
*6                           OF COMPARE TO SET THE RETURN CODE                00283000
*/                    3. . . FIND THE NEXT LOGICAL OPERATOR AND               00289000
*6                           SET THE POINTER PAST IT                          00290000
*/                    3. . . IF THE LOGICAL OPERATOR IS AN 'AND'              00292000
*6                           AND THE RETURN CODE IS FALSE THEN                00293000
*/                    4. . . . UNTIL THE LOGICAL OPERATOR SKIPPED             00295000
*6                             IS AN 'OR' OR THE END OF THE                   00296000
*6                             QUALIFICATION CONDITION IS                     00297000
*6                             REACHED DO                                     00298000
*/                    5. . . . . ACCESS THE NEXT TERM (RQLKERCH)              00301000
*/                    5. . . . . FIND THE NEXT LOGICAL OPERATOR               00304000
*6                               AND SET THE POINTER PAST IT                  00305000
*/                    4. . . . ENDDO UNTIL                                    00307000
*/                    3. . . ENDIF                                            00309000
*/                    2. . ENDDO UNTIL                                        00311000
*/                    1. ENDIF                                                00313000
*/                    1. RETURN TO CALLER                                     00315000
*/                       END (CHECK CRITERIA)                                 00318000
*****************************************************************             00320000
*                     ACCESS THE NEXT TERM                                    00321000
*                         ACCNXTM                                             00322000
*****************************************************************             00323000
*                                                                             00324000
*    FUNCTION: THIS IS A SUBROUTINE TO DO THE CALL TO RQLKERCH                00325000
*****************************************************************             00350000
*                  SKIP PRECEEDING FILL CHARACTERS                *           00351000
*                         SKIPFILL                                            00352000
*****************************************************************             00353000
```

```
*    FUNCTION: THIS IS A SUBROUTINE TO SKIP PRECEEDING
*              FILL CHARACTERS FOR THE SEARCH FOR COMPARISON
*              OPERATORS AND THE SEARCH FOR A LOGICAL OPERATOR
*/                            BEGIN (SKIP FILL)
*/                            1. SCAN FOR A NON-FILL
*/                            1. IF A NON-FILL IS FOUND THEN
*/                            2. . MOVE THE POINTER BACK TO IT
*/                            1. ENDIF
*/                            END (SKIP FILL)
****************************************************************
*                   TEST FOR OLD COMPARE OPERATOR
*                              TOLOCCMP
****************************************************************
*    FUNCTION: THIS SUBROUTINE CHECKS TO SEE IF THE BEGINNING
*              OF A STRING POINTED TO BY THE INPUT IS A OLD
*              CONTROL AND IF IT IS, IT CHECKS TO SEE IF IT
*              IS ONE OF THE COMPARISON OPERATORS
*/                            BEGIN (TEST FOR OLD COMPARE)
*/                            1. SET THE OUTPUT TO 'NOT A OLD COMPARE
*&                               OPERATOR'
*/                            1. IF THE INPUT STRING IS THE BEGINNING OF
*&                               A CONTROL THEN
*/                            2. . IF IT IS A OLD CONTROL THEN
*/                            3. . . IF THE CONTROL IS EQ,LT,GT, OR NE
*&                                   THEN
*/                            4. . . . SET THE OUTPUT TO 'IT IS A OLD
*&                                     COMPARISON OPERATOR'
*/                            3. . . ENDIF EQ,LT,GT, OR NE
*/                            2. . ENDIF A OLD
*/                            1. ENDIF A CONTROL
*/                            1. RETURN TO CALLER
*/                            END (TEST FOR OLD COMPARE)
****************************************************************
*                   PROCESS A OLD COMPARE
*                              POLOCCMP
****************************************************************
*    FUNCTION: THIS IS A SUBROUTINE TO SET THE CONDITION CODE
*              AFTER A COMPARISON OPERATOR IS FOUND AND THEN
*              MOVE THE PROCESSING POINTER PAST TO THE NEXT
*              DATA TO BE PROCESSED.
*/                            BEGIN (PROCESS OLD COMPARE)
*/                            1. UPDATE THE CONDITION WITH THE OLD
*&                               OPERATOR
*/                            1. SKIP THE OLD
*/                            1. SKIP ANY FILL BEFORE THE NEXT DATA
*&                               (SKIPFILL)
*/                            1. RETURN TO CALLER
*/                            END (PROCESS OLD COMPARE)
****************************************************************
*                   PROCESS OLD LOGIC OPERATOR
*                              POLOLOG
****************************************************************
*    FUNCTION: THIS SUBROUTINE MOVES THE PROCESSING POINTER
*              PAST THE NEXT LOGIC OPERATOR AND SETS THE CONDITION
*              TO 'AND' OR 'OR' AS DETERMINED BY THE OPERATOR
*              SKIPPED.
*                              BEGIN (PROCESS OLD LOGIC OPERATOR)
*/                            1. SET OPERATOR FOUND TO 'OR'
*/                            1. IF NOT PAST THE END OF THE STRING THEN
*&                               (IT HAS TO BE A OLD)
*/                            1. SKIP ANY PRECEEDING FILL (SKIPFILL)
*/                            2. . IF THE OLD IS AN 'AND' THEN
*/                            3. . . SET OPERATOR FOUND TO 'AND'
*/                            2. . ENDIF
*/                            2. . SKIP THE OLD
*/                            1. ENDIF
*/                            END (PROCESS OLD LOGIC OPERATOR)
*//                           COMPARE CONDITION BIT PATTERN TABLE
*//                           LOCAL EQUATES
*//                           DSECTS
*) COMMENTS RIGHT
********-START-OF-SPECIFICATIONS-*******************************
* PROGRAM NAME: ROLARCMP
*
* DESCRIPTIVE NAME: ARITHMETIC COMPARE
*
* COPYRIGHT: XXXX-XXX (C) COPYRIGHT IBM CORPORATION 1980
*            LICENSED MATERIAL - PROGRAM PROPERTY OF IBM
*            REFER TO COPYRIGHT INSTRUCTIONS FORM NO. G120-2083
*
* STATUS: RELEASE RS2, COMPONENT ROL, VERSION 00.00
*
* FUNCTION:
*       THIS CSECT PERFORMS AN ALGEBRAIC COMPARISON OF THE TWO
*       FIELDS. THE ASSUMPTIONS ARE:
*       - THE FIRST CHARACTER IS "+", "-", OR THE FIRST CHARACTER
*         OF THE NUMBER.
*       - THE NUMBER USES ONLY THE CHARACTERS 0-9, ".", ",", AND
*         ":".
```

```
*         - THE VALID DECIMAL POINT INDICATORS ARE ".", ",", AND      * 00025000
*           ":". ONLY ONE OF THE INDICATORS IS IN THE NUMBER AND      * 00026000
*           IT OCCURS ONLY ONCE (IF AT ALL).  IF THERE IS NO          * 00027000
*           INDICATOR, THE DECIMAL POINT IS ASSUMED AFTER THE LAST    * 00028000
*           DIGIT.                                                    * 00029000
*                                                                     * 00030000
* NOTES:                                                              * 00031000
*                                                                     * 00032000
*   DEPENDENCIES:                                                     * 00033000
*                                                                     * 00034000
*   RESTRICTIONS:                                                     * 00035000
*                                                                     * 00036000
*   REGISTER CONVENTIONS: STANDARD PANTHER REGISTER CONVENTIONS       * 00037000
*                                                                     * 00038000
* PROGRAM TYPE: PROCEDURE                                             * 00039000
*                                                                     * 00040000
*   PROCESSOR: 370 HOSTED 8086 ASSEMBLER                              * 00041000
*                                                                     * 00042000
*   PROGRAM SIZE:  340  LOC/  816  BYTES                              * 00043000
*                                                                     * 00044000
*   ATTRIBUTES: REENTRANT                                             * 00045000
*                                                                     * 00046000
* ENTRY POINT: RQLARCMP                                               * 00047000
*                                                                     * 00048000
*   LINKAGE: INVOKE                                                   * 00049000
*                                                                     * 00050000
* INPUT:                                                              * 00051000
*         - BP POINTS TO EXPLICIT STACK PASSED PARAMETERS.  THE       * 00052000
*           FOLLOWING LIST GIVES THE OFFSET FROM BP AND THE           * 00053000
*           PARAMETER:                                                * 00054000
*             OFFSET 0 - 2 BYTES: LENGTH OF FIELD B                   * 00055000
*                    2 - 2         POINTER TO FIELD B                 * 00056000
*                    4 - 2         LENGTH OF FIELD A                  * 00057000
*                    6 - 2         POINTER TO FIELD A                 * 00058000
*         - DS IS THE SEGMENT POINTER FOR FIELD A.                    * 00059000
*         - ES IS THE SEGMENT POINTER FOR FIELD B.                    * 00060000
*                                                                     * 00061000
* OUTPUT:                                                             * 00062000
*         - RETURN CODE IN AL.                                        * 00063000
*         - REASON CODE IN AH.                                        * 00064000
*                                                                     * 00065000
* EXIT-NORMAL:                                                        * 00066000
*     RETURN CODES                                                    * 00067000
*                                                                     * 00068000
*         0 - SUCCESSFUL                                              * 00069000
*                                                                     * 00070000
*                                                                     * 00071000
*     REASON CODES                                                    * 00072000
*                                                                     * 00073000
*         0 -- BIT ENCODED AS FOLLOWS:                                * 00074000
*              .... ...1  SET IF A GT B                               * 00075000
*              .... ..1.  SET IF A EQ B                               * 00076000
*              .... .1..  SET IF A LT B                               * 00077000
*                                                                     * 00078000
*                                                                     * 00079000
* EXIT-ERROR: NONE                                                    * 00080000
*                                                                     * 00081000
* EXTERNAL REFERENCES:                                                * 00082000
*                                                                     * 00083000
*   ROUTINES:                                                         * 00084000
*                                                                     * 00085000
*     NONE.                                                           * 00086000
*                                                                     * 00087000
*   DATA AREAS:                                                       * 00088000
*                                                                     * 00089000
*                                                                     * 00090000
*   CONTROL BLOCKS:                                                   * 00091000
*                                                                     * 00092000
*     CONTROL BLOCKS REFERENCED:                                      * 00093000
*                                                                     * 00094000
*       NONE.                                                         * 00095000
*                                                                     * 00096000
*                                                                     * 00097000
*     CONTROL BLOCKS MODIFIED:                                        * 00098000
*                                                                     * 00099000
*       NONE.                                                         * 00100000
*                                                                     * 00101000
* TABLES:                                                             * 00102000
*                                                                     * 00103000
*     NONE.                                                           * 00104000
*                                                                     * 00105000
* MACROS:                                                             * 00106000
*                                                                     * 00107000
*     NONE.                                                           * 00108000
*                                                                     * 00109000
*                                                                     * 00110000
* CHANGE ACTIVITY:                                                    * 00111000
*                                                                     * 00112000
***********************-END-OF-SPECIFICATIONS-************************* 00113000
                            BEGIN (ARITHMETIC COMPARE)                  00141000
*//                    1.  SET UP POINTERS TO A AND B                   00144000
*//                    1.  IF THE FIRST CHARACTER IN A IS "-" THEN      00152000
*//                    2.    MOVE THE POINTER PAST THE SIGN OF A        00155000
*//                    2.    IF THE FIRST CHARACTER IN B IS "-"         00156000
*//                          THEN                                       00159000
*6                     3.      MOVE THE POINTER PAST THE SIGN OF B      00162000
*//                    3.      CALL COMPARE POSITIVE (CMPPOS)           00165000
*//                    3.      REVERSE THE SENSE OF THE RESULT          00167000
*//                    2.    ELSE                                       00171000
```

```
*//                              3. . . IF THE FIRST CHARACTER IN B IS "+"      00173000
*C                                      THEN                                    00174000
*//                              4. . . . MOVE POINTER PAST IT                  00177000
*//                              3. . . ENDIF                                   00180000
*/                               3. . . SET RESULT TO A LT B                    00182000
*/                               3. . . CHANGE THE RESULT TO A EQ B IF BOTH     00184000
*C                                      NUMBERS ARE ZERO (CHKZEROS)             00185000
*//                              2. . ENDIF                                     00187000
*/                               1. ELSE                                        00188000
*//                              2. . IF THE FIRST CHARACTER IN A IS "+"        00190000
*C                                      THEN                                    00192000
*//                              3. . . MOVE POINTER PAST IT                    00195000
*/                               2. . ENDIF                                     00196000
*//                              2. . IF THE FIRST CHARACTER IN B IS "-"        00200000
*C                                      THEN                                    00201000
*//                              3. . . MOVE THE POINTER PAST THE SIGN OF B     00204000
*/                               3. . . SET RESULT TO A GT B                    00207000
*/                               3. . . CHANGE THE RESULT TO A EQ B IF BOTH     00209000
*C                                      NUMBERS ARE ZERO (CHKZEROS)             00210000
*//                              2. . ELSE                                      00212000
*//                              3. . . IF THE FIRST CHARACTER IN B IS "+"      00214000
*C                                      THEN                                    00215000
*//                              4. . . . MOVE POINTER PAST IT                  00216000
*//                              3. . . ENDIF                                   00221000
*/                               3. . . CALL COMPARE POSITIVE (CMPPOS)          00223000
*/                               2. . ENDIF                                     00225000
*/                               1. ENDIF                                       00227000
*/                               1. RETURN TO CALLER                            00229000
*/                               END (ARITHMETIC COMPARE)                       00232000
*****************************************************************************  00234000
*                         COMPARE POSITIVE                                   *  00235000
*                            CMPPOS                                          *  00236000
*****************************************************************************  00237000
*                                                                            *  00238000
*    FUNCTION: THIS SUBROUTINE COMPARES TWO STRINGS THAT ARE                 *  00239000
*              ASSUMED TO BE POSITIVE. IF NEGATIVE NUMBERS                   *  00240000
*              ARE COMPARED, THE INPUT POINTERS SHOULD POINT                 *  00241000
*              PAST THE SIGNS AND IF THE RETURN INDICATES AN                 *  00242000
*              INEQUALITY THEN THE RESULT SHOULD BE REVERSED.                *  00243000
*                                                                            *  00244000
*              IF THE NUMBERS ARE POSITIVE THEN THE POINTERS                 *  00245000
*              SHOULD POINT PAST THE SIGN ("+") IF IT IS IN                  *  00246000
*              THE STRING.                                                   *  00247000
*/                               BEGIN (COMPARE POSITIVE)                       00306000
*/                               1. SET RESULT TO EQUAL                         00308000
*/                               1. IF FIELD A IS EMPTY THEN                    00310000
*C                               2. . DETERMINE THE RESULT BY THE LONGER        00312000
*                                      STRING                                   00313000
*/                               1. ELSE                                        00316000
*/                               2. . IF FIELD B IS EMPTY THEN                  00318000
*C                               3. . . DETERMINE THE RESULT BY THE LONGER      00320000
*                                      STRING                                   00321000
*/                               2. . ELSE                                      00324000
*C                               3. . . FIND THE MSB, DECIMAL POINT AND         00326000
*                                      SCALE FACTOR FOR A (FMSBDPS)             00327000
*C                               3. . . FIND THE MSB, DECIMAL POINT AND         00335000
*                                      SCALE FACTOR FOR B (FMSBDPS)             00336000
*/                               3. . . IF SCALE A IS EQUAL TO SCALE B THEN     00344000
*/                               4. . . . SET RESULT TO 'EQUAL'                 00347000
*/                               4. . . . DO A STRING COMPARE STARTING WITH     00349000
*                                          THE MSB'S                            00350000
*/                               4. . . . IF A DIFFERENCE IS FOUND THEN         00358000
*C                               5. . . . . MAKE THE FIELD WITH THE LARGER      00360000
*                                            DIGIT LARGEST                      00361000
*C                               5. . . . . IF IT IS AT THE DECIMAL POINT       00366000
*                                            THEN                               00367000
*/                               6. . . . . . CONTINUE THE STRING COMPARE       00371000
*/                               6. . . . . . IF A DIFFERENCE IS FOUND THEN     00382000
*/                               7. . . . . . . MAKE THE FIELD WITH THE         00384000
*C                                                LARGER DIGIT LARGEST           00385000
*/                               6. . . . . . ELSE                              00390000
*/                               7. . . . . . . DETERMINE THE RESULT BY THE    00392000
*C                                                LONGER STRING (DETBYLS)       00393000
*/                               6. . . . . . ENDIF                             00395000
*/                               5. . . . . ENDIF                               00397000
*/                               4. . . . ELSE                                  00399000
*/                               5. . . . . DETERMINE THE RESULT BY THE         00401000
*C                                            LONGER STRING (DETBYLS)           00402000
*/                               4. . . . ENDIF                                 00404000
*/                               3. . . ELSE                                    00406000
*/                               4. . . . MAKE THE FIELD WITH THE LARGER        00408000
*C                                          SCALE LARGEST                       00409000
*/                               3. . . ENDIF                                   00414000
*/                               2. . ENDIF                                     00416000
*/                               1. ENDIF                                       00418000
*/                               1. RETURN TO CALLER                            00420000
*/                               END (COMPARE POSITIVE)                         00421000
*****************************************************************************  00424000
*                FIND MSB, DECIMAL POINT AND SCALE                            *  00425000
*                            FMSBDPS                                         *  00426000
*****************************************************************************  00427000
*                                                                            *  00428000
*    FUNCTION: THIS SUBROUTINE FINDS THE MOST SIGNIFICANT                    *  00429000
*              BYTE (MSB), THE DECIMAL POINT (DP) AND THE SCALE              *  00430000
*              FACTOR (SF = DP OFFSET - MSB OFFSET) FOR A GIVEN              *  00431000
*              NUMBER                                                        *  00432000
*                                                                            *  00433000
```

```
     THIS SUBROUTINE ASSUMES THE INPUT POINTER IS
     PAST THE SIGN CHARACTER OF THE NUMBER.

IF NO NON-ZERO DIGIT IS FOUND THEN THE MSB
     POINTER IS SET EQUAL TO THE DECIMAL POINT
     POINTER.
                    BEGIN (FIND MSB,DP,SP)
                 1. FIND THE DECIMAL POINT
                 1. BEGIN
                 2. . UNTIL END OF STRING OR DECIMAL POINT
                       FOUND DO
                 3. . . TEST CHARACTER FOR PERIOD, COMMA OR
                         COLON (VALID DECIMAL POINTS)
                 2. . ENDDO UNTIL END OF STRING OR DECIMAL
                       POINT FOUND
                 2. . SAVE DECIMAL POINT POINTER FOR OUTPUT
                 1. END
                 1. SCAN FOR MSB (NON-ZERO CHARACTER) FROM
                       THE BEGINNING OF THE STRING
                 1. IF A NONZERO DIGIT IS FOUND THEN
                 2. . BACK POINTER UP TO IT
                 2. . IF THE NONZERO VALUE WAS AT THE
                         DECIMAL POINT THEN
                 3. . . CONTINUE THE SCAN PAST THE DECIMAL
                         POINT
                 3. . . IF A NON-ZERO DIGIT FOUND THEN
                 4. . . . BACK THE POINTER UP TO IT
                 3. . . ELSE
                 4. . . . SET THE MSB POINTER EQUAL TO THE
                             DECIMAL POINT POINTER
                 3. . . ENDIF
                 2. . ENDIF
                 1. ENDIF
                 1. COMPUTE THE SCALE FACTOR (CP OFFSET -
                       MSB OFFSET)
                 1. RETURN TO CALLER
                    END (FIND MSB,DP,SP)
****************************************************
         DETERMINE THE RESULT BY THE LONGER STRING
                    DETBYLS
****************************************************
  FUNCTION: THIS SUBROUTINE WILL DETERMINE THE COMPARISON
            RESULT BY CHECKING TO SEE IF THE LONGER STRING
            HAS ANY NON-ZERO CHARACTERS REMAINING (ASSUMING
            AN EQUALS COMPARISON TO THE END OF THE SHORTER
            FIELD).

IT IS ASSUMED THAT THE SCALE FACTOR HAS BEEN
            CHECKED SO THAT A SPECIAL TEST TO SEE IF THE
            FIRST CHARACTER CAN BE A DECIMAL POINT IS NOT
            NECESSARY.

BEGIN (DETERMINE RESULT BY LONGER STRING)
                 1. IF THE REMAINING LENGTH OF FIELD A IS
                       NOT ZERO THEN
                 2. . CHECK FIELD A FOR TRAILING ZEROS
                       (TRAILZER)
                 2. . IF REMAINDER OF FIELD A IS NOT ZERO
                       THEN
                 3. . . SET RESULT TO A GT B
                 2. . ENDIF REMAINDER OF FIELD A IS NOT ZERO
                 1. ELSE LENGTH OF A IS ZERO
                 2. . IF THE REMAINING LENGTH OF FIELD B IS
                       NOT ZERO THEN
                 3. . . CHECK FIELD B FOR TRAILING ZEROS
                         (TRAILZER)
                 3. . . IF THE REMAINDER OF FIELD B IS NOT
                         ZERO THEN
                 4. . . . SET RESULT TO A LT B
                 3. . . ENDIF REMAINDER OF FIELD B IS NOT
                       ZERO
                 2. . ENDIF LENGTH OF B IS NOT ZERO
                 1. ENDIF LENGTH OF A IS NOT ZERO
                    END (DETERMINE RESULT BY LONGER STRING)
****************************************************
         CHECK FOR ZERO VALUES
                    CHKZEROS
****************************************************
  FUNCTION: THIS SUBROUTINE CHECKS TO SEE IF TWO NUMBERS ARE
            BOTH ZERO. IF THEY ARE, A RETURN CODE IS PASSED
            BACK TO INDICATE THEY ARE EQUAL, OTHERWISE THE
            CONDITION THAT WAS IN THE RETURN CODE ON INPUT IS
            UNALTERED. THE POINTERS ARE ASSUMED TO POINT PAST
            THE SIGN CHARACTER (IF IT EXISTS) IN BOTH FIELDS.
                    BEGIN (CHECK FOR ZERO VALUES)
                 1. SEE IF FIELD B IS ONLY ZEROS (TRAILZER)
                 1. IF B IS ZERO THEN
                 2. . SEE IF FIELD A IS ONLY ZEROS
                       (TRAILZER)
                 2. . IF A IS ZERO THEN
                 3. . . SET REASON CODE TO EQUALS
                 2. . ENDIF
                 1. ENDIF
                 1. RETURN TO CALLER
                    END (CHECK FOR ZERO VALUES)
```

```
****************************************************************
*                  CHECK FOR TRAILING ZEROS                    *
*                         TRAILZER                             *
****************************************************************
*   FUNCTION: THIS SUBROUTINE CHECKS A STRING TO SEE IF ONLY   *
*             ZEROS REMAIN.  A DECIMAL POINT CAN ALSO OCCUR IN *
*             THE STRING.  THIS SUBROUTINE CAN BE USED TO TEST *
*             TO SEE IF A NUMBER IS ZERO (BY SETTING THE INPUT *
*             POINTER PAST THE SIGN CHARACTER).  IT CAN ALSO BE*
*             USED TO SEE IF INSIGNIFICANT TRAILING ZEROS EXIST*
*             IN A NUMBER.  THIS WOULD BE CHECKED IN A CASE WHERE*
*             A STRING OF NUMERIC CHARACTERS IS LONGER THAN ANOTHER*
*             AND THEY COMPARE EQUAL UP TO THE END OF THE SHORTER*
*             STRING.  IF THE REMAINDER OF THE LONGER STRING IS*
*             ONLY ZEROS OR IF IT IS A DECIMAL POINT FOLLOWED ONLY*
*             BY ZEROS THEN THE NUMBERS WOULD BE CONSIDERED EQUAL.*
*             ASSUMING THAT THE DECIMAL POINTS HAVE BEEN DETERMINED*
*             TO BE IN THE SAME PLACE (EITHER IN BOTH STRINGS OR*
*             ASSUMED AFTER THE LAST CHARACTER OF THE SHORTER STRING)*
*             THEN THIS SUBROUTINE CAN BE USED WITHOUT MAKING AN*
*             EXPLICIT TEST THAT A DECIMAL POINT IN THE LONGER *
*             STRING HAS ALREADY BEEN PASSED OR IS THE FIRST  *
*             'EXTRA' CHARACTER.                               *

*/              BEGIN (CHECK FOR TRAILING ZEROS)
*/              1. SET RESULT TO 'ZERO'
*/              1. SCAN FOR A NON-ZERO DIGIT
*/              1. IF A NON-ZERO DIGIT IS FOUND THEN
*/              2. . SET RESULT TO 'NOT ZERO'
*/              2. . IF IT IS A DECIMAL POINT THEN
*/              3. . . SCAN FOR A NON-ZERO DIGIT
*&              3. . . IF A NON-ZERO DIGIT IS NOT FOUND
                         THEN
                4. . . . SET RESULT TO 'ZERO'
                3. . . ENDIF
                2. . ENDIF
                1. ENDIF
                1. RETURN TO CALLER
                END (CHECK FOR TRAILING ZEROS)
                LOCAL EQUATES
                DSECTS
```

```
*! COMMENTS RIGHT
****************-START-OF-SPECIFICATIONS-***********************
*
* PROGRAM NAME: RQLCSCMP                                       *
*                                                              *
* DESCRIPTIVE NAME: CHARACTER STRING COMPARE                   *
*                                                              *
* COPYRIGHT: XXXX-XXX (C) COPYRIGHT IBM CORPORATION 1980       *
*            LICENSED MATERIAL - PROGRAM PROPERTY OF IBM       *
*            REFER TO COPYRIGHT INSTRUCTIONS FORM NO. G120-2083*
*                                                              *
* STATUS: RELEASE RS2, COMPONENT RQL, VERSION 00.00            *
*                                                              *
* FUNCTION:                                                    *
*    IF FIELD A IS NOT A 'CONTROL' STRING, THEN THE DATA IS    *
*    CONSIDERED TO BE A CHARACTER STRING FROM A FIELD IN A     *
*    RECORD, JUST AS FIELD B IS.  IF FIELD A IS A 'CONTROL'    *
*    STRING THEN IT IS CONSIDERED TO BE A CONSTANT FROM THE    *
*    RECORD SELECTION FRAME AND SPECIAL RULES ARE INTRODUCED TO*
*    HANDLE CONTROLS (MASKING CHARACTERS).  THE SYNTAX FOR A   *
*    CONTROL STRING IS DEFINED AND VALIDATED BY RQLKBCH DURING *
*    KEYING BY THE OPERATOR AND THIS CSECT ASSUMES A           *
*    SYNTACTICALLY CORRECT CONSTANT AS DEFINED BY RQLKBCH.  THE*
*    FOLLOWING SEMANTIC DEFINITION OF COMPARISONS OF STRINGS   *
*    STARTS WITH THE NON-CONTROL CASE AND THEN EXTENDS THE     *
*    DEFINITION TO THE CONTROL CASE.                           *
*    - IF TWO CHARACTER STRINGS ARE OF EQUAL LENGTH, THEN THE  *
*      COLLATING WEIGHTS ARE USED TO DETERMINE THE COMPARISON. *
*      STARTING FROM THE LEFTMOST CHARACTER IN EACH STRING,    *
*      AND PROCEEDING TO THE RIGHT, CORRESPONDING CHARACTERS   *
*      ARE COMPARED UNTIL CHARACTERS OF DIFFERENT COLLATING    *
*      WEIGHTS ARE FOUND OR ALL CHARACTERS HAVE BEEN EXAMINED  *
*      OR AN INEQUALITY IS FOUND.  IF NO DIFFERENCE IN         *
*      COLLATING WEIGHTS OF ANY CORRESPONDING CHARACTERS IS    *
*      FOUND THEN THE STRINGS ARE CONSIDERED EQUAL.  IF A PAIR *
*      OF CORRESPONDING CHARACTERS IS FOUND WITH DIFFERENT     *
*      COLLATING WEIGHTS, THEN THE STRING CONTAINING THE       *
*      CHARACTER WITH THE SMALLER COLLATING WEIGHT IS          *
*      CONSIDERED LESS THAN THE OTHER STRING.                  *
*    - IF TWO CHARACTER STRINGS ARE OF DIFFERENT LENGTHS THEN  *
*      THE COMPARISON IS DONE IN THE SAME MANNER AS FOR        *
*      STRINGS OF EQUAL LENGTH UNTIL ALL THE CHARACTERS IN THE *
*      SHORTER STRING HAVE BEEN EXAMINED.  IF AN INEQUALITY    *
*      HAS NOT BEEN DETERMINED AFTER ALL CHARACTERS IN THE     *
*      SHORTER STRING HAVE BEEN EXAMINED, THEN THE REMAINING   *
*      CHARACTERS OF THE LONGER STRING ARE USED TO DETERMINE   *
*      THE RESULT.  IF ALL THE REMAINING CHARACTERS IN THE     *
*      LONGER STRING ARE SPACES OR HAVE A COLLATING WEIGHT OF  *
*      ZERO (INDICATING THAT THE CHARACTER IS TO BE IGNORED)   *
*      THEN THE STRINGS ARE CONSIDERED EQUAL.  IF THERE IS AT  *
*      LEAST ONE CHARACTER IN THE REMAINING CHARACTERS OF THE  *
*      LONGER STRING THAT IS NOT A SPACE AND HAS A NON-ZERO    *
*      COLLATING WEIGHT, THEN THE LONGER STRING IS CONSIDERED  *
*      GREATER THAN THE SHORTER STRING.                        *
*    - THE FOLLOWING RULES DEAL WITH 'CONTROL STRINGS' (THE    *
```

```
*          CONSTANTS FROM THE RECORD SELECTION FRAME).  'A' WILL
*          BE USED TO REFER TO THE CONTROL STRING AND 'B' WILL BE
*          USED TO REFER TO FIELD DATA BEING COMPARED TO THE
*          CONTROL STRING.
*          - THE CONSTANT IN A IS TREATED AS IF IT IS A FIELD DATA
*            VALUE WHEN COMPARING TO B UNLESS A MASKING CHARACTER
*            IS ENCOUNTERED.
*          - CONTROLS (MASKING CHARACTERS) ARE HANDLED AS FOLLOWS:
*            - POSITIONAL MASK (HALF INDEXED UP PERIOD).  WHEN A
*              POSITIONAL MASK IS ENCOUNTERED IN A, IT IS
*              CONSIDERED EQUAL TO THE CORRESPONDING CHARACTER IN
*              B THAT IT IS COMPARED TO.  THIS TEST TO SKIP THE
*              CHARACTER IN B IS DONE BEFORE SKIPPING CHARACTERS
*              IN B THAT HAVE A COLLATING WEIGHT OF ZERO.  IF THIS
*              MASK IS ENCOUNTERED IN A POSITION IN A FOR WHICH
*              THERE IS NO CORRESPONDING CHARACTER IN B (AS WHEN A
*              IS LONGER THAN B), THEN THE MASK IS INTERPRETED AS
*              REQUIRING A CHARACTER FOR THAT POSITION AND A IS
*              CONSIDERED GREATER THAN B.  THIS MEANS THAT IF THE
*              POSITIONAL MASK IS ENCOUNTERED IN THE REMAINING
*              PART OF A WHEN A IS LONGER THAN B AND THEY
*              OTHERWISE COMPARE EQUAL, THAT A IS GREATER THAN B
*              (AS IF A NON-SPACE WITH A NON-ZERO COLLATING WEIGHT
*              WAS FOUND).
*
*            - VARIABLE LENGTH MASK (HALF INDEXED UP QUESTION
*              MARK).  WHEN A VARIABLE-LENGTH MASK IS ENCOUNTERED
*              IN A, THEN IF THE END OF B HAS NOT BEEN ENCOUNTERED
*              AND THEY OTHERWISE COMPARE AS EQUAL THEN NO MORE
*              SCANNING OF B IS REQUIRED AND A IS CONSIDERED EQUAL
*              TO B.  UNLIKE THE POSITIONAL MASK, IF THE VARIABLE
*              LENGTH MASK IS ENCOUNTERED IN A WHEN TRYING TO
*              DETERMINE A RESULT WHILE SCANNING THE REMAINING
*              PORTION OF A, NO CHARACTER IS REQUIRED IN B AND IF
*              ALL OTHER RULES INDICATE EQUALITY, THEN A IS EQUAL
*              TO B.
*
* NOTES:
*
*   DEPENDENCIES:
*
*   RESTRICTIONS:
*     IF A CONTROL STRING IS INPUT THEN IT MUST CONTAIN AT
*     LEAST ONE CHARACTER.  IF A IS NOT A CONTROL STRING THEN
*     IT MAY BE OF LENGTH ZERO.  STRING B CAN ALWAYS BE OF
*     LENGTH ZERO.
*
*   REGISTER CONVENTIONS: STANDARD PANTHER REGISTER CONVENTIONS
*
* PROGRAM TYPE: PROCEDURE
*
*   PROCESSOR: 370 HOSTED 8086 ASSEMBLER
*
*   PROGRAM SIZE: 176 LOC/ 376 BYTES
*
*   ATTRIBUTES: REENTRANT
*
* ENTRY POINT: RULCSCMP
*
*   LINKAGE: INVOKE
*
* INPUT:
*          - BP POINTS TO EXPLICIT STACK PASSED PARAMETERS.  THE
*            FOLLOWING LIST GIVES THE OFFSET FROM BP AND THE
*            PARAMETER:
*            0 - CONTROL INDICATOR
*                RULCSCCI - BIT ON INDICATES A IS A CONTROL
*                STRING.
*            1 - UNUSED BYTE
*            2 - LENGTH OF B
*            4 - POINTER TO B
*            6 - LENGTH OF A
*            8 - POINTER TO A
*          - DS POINTS TO THE SEGMENT FIELD A IS IN.
*          - ES POINTS TO THE SEGMENT FIELD B IS IN.
*          - SS POINTS TO PCB.
*
* OUTPUT:
*          - RETURN CODE IN AL
*          - REASON CODE IN AH
*
* EXIT-NORMAL:
*     RETURN CODES
*
*         0 - SUCCESSFUL
*
*     REASON CODES
*
*         0 -- BIT ENCODED AS FOLLOWS:
*              .... ...1   SET WHEN A GT B
*              .... ..1.   SET WHEN A EQ B
*              .... .1..   SET WHEN A LT B
*
* EXIT-ERROR: NONE
*
* EXTERNAL REFERENCES:
*
*   ROUTINES:
```

```
*          NONE.                                                                *  00160000
*                                                                               *  00161000
*       DATA AREAS:                                                             *  00162000
*          NONE.                                                                *  00163000
*                                                                               *  00164000
*       CONTROL BLOCKS:                                                         *  00165000
*       CONTROL BLOCKS REFERENCED:                                              *  00167000
*                                                                               *  00168000
*       +--------+----------+--------+------------------------------------+     *  00169000
*       | CNTL   | FIELD    | BIT(S) | DESCRIPTION                        |     *  00170000
*       | BLK    | NAME     | NAME   |                                    |     *  00171000
*       +--------+----------+--------+------------------------------------+     *  00172000
*       | IPCB   |          |        | PROCESS CONTROL BLOCK              |     *  00173000
*       +--------+----------+--------+------------------------------------+     *  00174000
*       |        | IPCBUSER |        | POINTER TO THE AVT                 |     *  00175000
*       +--------+----------+--------+------------------------------------+     *  00176000
*       | RAVT   |          |        | RECORDS APPLICATION VECTOR TABLE   |     *  00177000
*       +--------+----------+--------+------------------------------------+     *  00178000
*       |        | RAVTCOLO |        | OFFSET OF COLLATING TABLE          |     *  00179000
*       |        | RAVTCOLS |        | SEGMENT OF COLLATING TABLE         |     *  00180000
*       +--------+----------+--------+------------------------------------+     *  00181000
*                                                                               *  00182000
*                                                                               *  00183000
*       CONTROL BLOCKS MODIFIED:                                                *  00184000
*          NONE.                                                                *  00185000
*                                                                               *  00186000
*       TABLES:                                                                 *  00187000
*                                                                               *  00188000
*          THE COLLATING TABLES IN THE RSUIDATA CSECT ARE USED.                 *  00189000
*                                                                               *  00190000
*       MACROS:                                                                 *  00191000
*                                                                               *  00192000
*          NONE.                                                                *  00193000
*                                                                               *  00194000
*                                                                               *  00195000
*                                                                               *  00196000
*    CHANGE ACTIVITY:                                                           *  00197000
*                                                                               *  00198000
***************************-END-OF-SPECIFICATIONS-******************************  00199000
*/                              BEGIN (CHARACTER STRING COMPARE)                   00234000
*/                              1. IF FIELD A IS A 'CONTROL' STRING THEN           00256000
*/                              2. . CALL PROCESS CONTROL STRING (PROCCS)          00258000
*/                              2. . IF A RESULT HAS NOT BEEN FOUND THEN           00260000
*/                              3. . . SET THE RESULT TO A EQ B                    00262000
*/                              3. . . IF THERE ARE MORE CHARACTERS IN             00264000
*£                                        FIELD B THEN                             00265000
*/                              4. . . . CALL DETERMINE RESULT BY LONGER           00267000
*£                                        STRING (DETBYLS) FOR FIELD B             00268000
*/                              3. . ENDIF (CHARACTERS LEFT IN B)                  00278000
*/                              2. . ENDIF (RESULT NOT FOUND)                      00280000
*/                              1. ELSE (NOT A CONTROL STRING)                     00282000
*/                              2. . CALL STRING COMPARE (STRCOMP)                 00284000
*/                              2. . IF A RESULT HAS NOT BEEN FOUND THEN           00286000
*/                              3. . . SET THE RESULT TO A EQ B                    00288000
*/                              3. . . IF THERE ARE REMAINING CHARACTERS IN        00290000
*£                                        FIELD A THEN                             00291000
*/                              4. . . . CALL DETERMINE RESULT BY LONGER           00293000
*£                                        STRING (DETBYLS) FOR FIELD A             00294000
*/                              3. . . ELSE (NO MORE CHARACTERS IN A)              00300000
*/                              4. . . . IF THERE ARE REMAINING CHARACTERS         00302000
*£                                        IN FIELD B THEN                          00303000
*/                              5. . . . . CALL DETERMINE RESULT BY LONGER         00305000
*£                                           STRING (DETBYLS) FOR FIELD B          00306000
*/                              4. . . . ENDIF (CHARACTERS LEFT IN B)              00316000
*/                              3. . . ENDIF (CHARACTERS LEFT IN A)                00318000
*/                              2. . ENDIF (RESULT NOT FOUND)                      00320000
*/                              1. ENDIF (A IS A CONTROL STRING)                   00322000
*/                              1. RETURN TO CALLER                                00324000
*/                              END (CHARACTER STRING COMPARE)                     00329000
********************************************************************************  00331000
*                         PROCESS CONTROL STRING                                *  00332000
*                                 PROCCS                                        *  00333000
********************************************************************************  00334000
*                                                                               *  00335000
*    FUNCTION: THIS SUBROUTINE COMPARES A CONTROL STRING IN                     *  00336000
*              FIELD A TO FIELD B. IF AN INEQUALITY IS NOT                      *  00337000
*              DETERMINED BY THE END OF THE CONTROL STRING THEN                 *  00338000
*              THE RESULT IS UNDETERMINED AND THE PROCESSING                    *  00339000
*              POINT REACHED IN FIELD B IS RETURNED TO THE CALLER.              *  00340000
*                                                                               *  00341000
*/                              BEGIN (PROCESS CONTROL STRING)                     00397000
*/                              1. UNTIL THE CONTROL STRING IS PROCESSED OR        00400000
*£                                 A RESULT IS FOUND DO                            00401000
*/                              2. . IF THE NEXT ITEM IN THE CONTROL STRING        00404000
*£                                    IS A CONTROL THEN                            00405000
*/                              3. . . IF THE CONTROL IS A POSITIONAL MASK         00410000
*£                                       THEN                                      00411000
*/                              4. . . . IF ALL CHARACTERS IN FIELD B HAVE         00414000
*£                                          BEEN PROCESSED THEN                    00415000
```

```
                                  3. . . . SET THE RESULT TO A GT B              00417000
*/                                4. . . ELSE (MORE CHARACTERS IN B)             00419000
*/                                5. . . . SKIP THE CONTROL IN FIELD A           00421000
*/                                5. . . . SKIP THE CHARACTER IN FIELD B         00428000
*/                                4. . . ENDIF (CHARACTERS IN B)                 00431000
*/                                3. . . ELSE (CONTROL MUST BE A VARIABLE        00433000
*C                                           LENGTH MASK)                        00434000
*/                                4. . . . SET THE RESULT TO A EQ B              00436000
*/                                4. . . . SKIP THE CONTROL IN A                 00438000
*/                                4. . . . SKIP ALL REMAINING CHARACTERS IN B    00445000
*/                                3. . . ENDIF (CONTROL IS POSITIONAL MASK)      00448000
*/                                2. . ELSE (NO CONTROL)                         00450000
*/                                3. . . FIND THE NUMBER OF CHARACTERS IN        00452000
*C                                           FIELD A TO THE NEXT CONTROL OR END  00453000
*C                                           OF THE STRING                       00454000
*/                                3. . . CALL STRING COMPARE FOR THIS SECTION    00467000
*C                                           OF FIELD A AND THE REMAINDER OF     00468000
*C                                           FIELD B                             00469000
*//                               3. . . IF ALL CHARACTERS IN CONTROL STRING     00471000
*C                                           NOT PROCESSED                       00472000
*//                               4. . . . CALL DETERMINE RESULT BY LONGER       00474000
*C                                           STRING FOR FIELD A                  00475000
*/                                3. . . ENDIF                                   00485000
*  NOTE THE REMAINING LENGTH OF A AND POINTER INTO A WILL MATCH                  00487000
*  ONLY IF NO SIGNIFICANT CHARACTERS WERE FOUND.                                 00488000
*/                                2. . ENDIF (A CONTROL IS FOUND)                00490000
*/                                1. ENDDO UNTIL (PROCESSED OR RESULT IS         00492000
*C                                           FOUND)                              00493000
*/                                END (PROCESS CONTROL STRING)                   00495000
***************************************************************                 00498000
*                                 STRING COMPARE                    *            00499000
*                                 STRCOMP                           *            00500000
***************************************************************                 00501000
*                                                                                00502000
*   FUNCTION: THIS IS A SUBROUTINE TO COMPARE TWO STRINGS.          *            00503000
*             IF THERE IS A CODE POINT DIFFERENCE THEN A            *            00504000
*             COLLATING TABLE IS USED TO DETERMINE IF THE           *            00505000
*             COMPARISON IS TO CONTINUE OR IF A RESULT CAN BE       *            00506000
*             DETERMINED. IF THE STRINGS COMPARE 'EQUAL'            *            00507000
*             THROUGH THE LAST CHARACTER OF THE SHORTER STRING,     *            00508000
*             THEN NO RESULT IS DETERMINED BY THIS SUBROUTINE (THE  *            00509000
*             CALLER MUST EVALUATE WHETHER THE REMAINDER OF THE     *            00510000
*             LONG STRING DETERMINES AN 'EQUAL' OR 'GREATER THAN'   *            00511000
*             RESULT).                                              *            00512000
*                                                                                00513000
                                  BEGIN (STRING COMPARE)                         00532000
*/                                1. WHILE THERE IS AT LEAST ONE CHARACTER IN    00533000
*C                                     BOTH STRINGS DO                           00534000
*/                                2. . UNTIL SCAN IS DONE OR A RESULT IS         00535000
*C                                        FOUND DO                               00536000
*/                                3. . . COMPARE THE TWO STRINGS                 00537000
*/                                3. . . IF A DIFFERENCE IS FOUND THEN           00538000
*/                                4. . . . FIND THE COLLATING VALUES             00539000
*/                                4. . . . IF THE COLLATING VALUE FOR A IS       00540000
*C                                           GREATER THAN THE COLLATING VALUE    00541000
*C                                           FOR B THEN                          00542000
*/                                5. . . . . IF THE COLLATING VALUE FOR B IS     00543000
*C                                              ZERO THEN                        00544000
*/                                6. . . . . . SKIP A CHARACTER IN B ONLY        00545000
*/                                5. . . . . ELSE                                00546000
*/                                6. . . . . . SET THE RESULT TO A GT B          00547000
*/                                5. . . . . ENDIF                               00548000
*/                                4. . . . ELSE (A LE B)                         00549000
*/                                5. . . . . IF THE COLLATING VALUE FOR A IS     00550000
*C                                              LESS THAN THE COLLATING VALUE    00551000
*C                                              FOR B THEN                       00552000
*/                                6. . . . . . IF THE COLLATING VALUE FOR A      00553000
*C                                                 IS ZERO THEN                  00554000
*/                                7. . . . . . . SKIP A CHARACTER IN A ONLY      00555000
*/                                6. . . . . . ELSE                              00556000
*/                                7. . . . . . . SET THE RESULT TO A LT B        00557000
*/                                6. . . . . . ENDIF                             00558000
*/                                5. . . . . ELSE (EQUALS)                       00559000
*/                                6. . . . . . SKIP A CHARACTER IN BOTH          00560000
*C                                              STRINGS                          00561000
*/                                5. . . . . ENDIF (A LT B)                      00562000
*/                                4. . . . ENDIF (A GT B)                        00563000
*/                                3. . . ENDIF (A DIFFERENCE)                    00564000
*/                                2. . ENDDO UNTIL                               00565000
*/                                1. ENDDO WHILE                                 00566000
*/                                END (STRING COMPARE)                           00567000
```

```
*  ***********************************************************    00667000
*                DETERMINE RESULT BY LONGER STRING                 00668000
*                          DETBYLS                                 00669000
*  ***********************************************************    00670000
*                                                                  00671000
*   FUNCTION: THIS IS A SUBROUTINE TO DETERMINE IF A STRING        00672000
*             CONTAINS REMAINING 'SIGNIFICANT' CHARACTERS.         00673000
```

```
*        A CHARACTER IS SIGNIFICANT IF IT IS NOT A SPACE AND        00674000
*        ITS COLLATING WEIGHT IS NON-ZERO.  THIS SUBROUTINE         00675000
*        IS USED DURING A CHARACTER STRING COMPARE                  00676000
*        WHEN TWO STRINGS COMPARE EQUAL UP TO THE                   00677000
*        LENGTH OF THE SHORTEST STRING.  IF THE LONGER STRING       00678000
*        HAS ANY SIGNIFICANT CHARACTERS IN ITS REMAINING PART       00679000
*        THEN IT IS CONSIDERED LARGER, OTHERWISE THE STRINGS        00680000
*        ARE EQUAL.  THIS SUBROUTINE IS USED TO SCAN THE            00681000
*        REMAINDER OF THE LONGER STRING.                            00682000
*/           BEGIN (DETERMINE BY LONGER STRING)                     00695000
*/           1.  SET RESULT TO 'SIGNIFICANT CHARACTER NOT           00696000
*C                 FOUND'                                           00697000
*/           1.  UNTIL THE END OF THE STRING OR                     00698000
*C                 SIGNIFICANT CHARACTER IS FOUND DO                00699000
*/           2.  .  IF THE CURRENT CHARACTER IS NOT A               00700000
*C                    SPACE THEN                                    00701000
*/           3.  .  .  LOOK UP THE COLLATING WEIGHT                 00702000
*/           3.  .  .  IF THE COLLATING WEIGHT IS NOT ZERO          00703000
*C                       THEN                                       00704000
*/           4.  .  .  .  SET RESULT TO 'SIGNIFICANT                00705000
*C                           CHARACTER FOUND'                       00706000
*/           3.  .  .  ENDIF                                        00707000
*/           2.  .  ENDIF                                           00708000
*/           2.  .  MOVE THE PROCESSING POINT TO THE NEXT           00709000
*C                    CHARACTER                                     00710000
*/           1.  ENDDO UNTIL                                        00711000
*/           END (DETERMINE BY LONGER STRING)                       00712000
*/***********************END-PSEUDOCODE-******************************00713000
*/           BEGIN (DETERMINE BY LONGER STRING)                     00715000
*/           1.  SET RESULT TO 'SIGNIFICANT CHARACTER NOT           00717000
*C                 FOUND'                                           00718000
*/           1.  UNTIL THE END OF THE STRING OR                     00720000
*C                 SIGNIFICANT CHARACTER IS FOUND DO                00721000
*/           2.  .  IF THE CURRENT CHARACTER IS NOT A               00724000
*C                    SPACE THEN                                    00725000
*/           3.  .  .  LOOK UP THE COLLATING WEIGHT                 00729000
*/           3.  .  .  IF THE COLLATING WEIGHT IS NOT ZERO          00731000
*C                       THEN                                       00732000
*/           4.  .  .  .  SET RESULT TO 'SIGNIFICANT                00734000
*C                           CHARACTER FOUND'                       00735000
*/           3.  .  .  ENDIF                                        00737000
*/           2.  .  ENDIF                                           00739000
*/           2.  .  MOVE THE PROCESSING POINT TO THE NEXT           00741000
*C                    CHARACTER                                     00742000
*/           1.  ENDDO UNTIL                                        00745000
*/           END (DETERMINE BY LONGER STRING)                       00747000
*********************************************************************00751000
```

Although a single embodiment of the invention has been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A system for processing information comprising:
   keyboard means for operator input of keystroke information, said keystroke information representing either data, logic operators or comparison operators;
   memory means for storing a file of information including a plurality of records, each record having a plurality of fields and rows;
   display means for displaying a selected record when said system is in an input edit mode, said display means also displaying in response to operator input, logic and comparison operators and field values in said selected record when said system is in a record selection mode; and
   control means responsive to input of keystroke information from said keyboard means for forming comparison groups in one or more preselected fields in a predetermined row of said selected record, each of said comparison groups including a comparison operator and a field value, said control means comparing the data stored within the preselected fields of each record to the field values in the manner required by the comparison operators and identifying the records where a comparison is found, said control means implicitly ANDing the identities of the records satisfying said comparison groups in said one or more preselected fields.

2. The system of claim 1 wherein the type of data to be entered into each field is recorded within said control means, said control means examining each portion of data input by the operator for storage in any given field and identifying data not of the type to be entered in the given field, said control means causing said display means to inform the operator upon such identification.

3. The system of claim 1 wherein the entry of a field value without entry of a comparison operator in the record selection mode in a comparison group causes said control means to compare the data to the field value with a preselected comparison operator.

4. The system of claim 1 wherein one or more symbols represented by keys mounted on said keyboard means are to be used as either data or a comparison operator, said keyboard means having first and second sections, each of said sections having a key representing the symbol, input of keystroke information representing the symbol from the key in the first section having indicators identifying the symbol to be a comparison operator, input of keystroke information representing the symbol from the key in the second section being entered as data.

5. The system of claim 4 wherein said control means distinguishes the display of the symbol when used as a comparison operator on said display means so that the function of the symbol is apparent.

6. The system of claim 1 wherein said control means recognizes selected symbols in comparing data to a field value, the selected symbols being preprogramed into said control means.

7. The system of claim 1 wherein the table format displayed on said display means includes a plurality of rows, said control means permitting input of keystroke information representing comparison groups interrelated by logic operators to fields in a plurality of rows, said control means identifying records having data where a comparison is found for all fields in a row for any of said plurality of rows.

8. The system of claim 1 wherein the table format displayed on said display means includes a plurality of rows, said control means permitting input of keystroke information representing comparison groups interrelated by logic operators to fields in a plurality of rows, said control means identifying records having data where a comparison is found for the field in a row for any of said plurality of rows.

9. A system for processing information comprising:
keyboard means for operator input of keystroke information by actuation of keys thereon, said keyboard means having first and second sections, keys representing comparison and logic operators being positioned in the first section and keys representing data being positioned in the second section;
memory means for storing a file of information including a plurality of records, each record having a plurality of fields and rows;
display means for displaying a cursor and a selected record in a table format including a field heading to identify each field displayed, the system being operable in an input edit mode permitting selected data to be displayed on said display means in the table format, the system further being operable in a record selection mode; and
control means responsive to input of keystroke information from said keyboard means for forming within one or more preselected fields of a predetermined row of said selected record, a plurality of comparison groups interrelated by a logic operator, each of said comparison groups including a comparison operator and data representing a field value, said control means also comparing the data stored within the preselected field to the field values for all records in said file in the manner required by the comparison operators to identify the records where a comparison is found, said control means combining the identified records where comparison is found for each comparison operator and field value in the manner directed by the logic operator to define the selected records for each of the preselected fields, said control means further implicitly ANDing the selected records in said fields.

10. The system of claim 9 wherein said control means permits the cursor to be positioned within fields displayed on rows other than the frist row and permits entry of keystroke information representing logic operators, comparison operators and field values into fields in said other rows, said control means identifying records having data where comparison is found for any row.

11. The system of claim 9 wherein said control means includes syntax check routine means for identifying improper syntax in data or field values entered by the operator, said syntax check routine means identifying improper data or field values and directing said display means to inform the operator of the identification.

12. The system of claim 11 wherein said syntax check routine means permits the type of data to be entered into each field to be preselected, said syntax check routine means further identifying data entered for entry into a field when the entered data type is improper.

13. The system of claim 9 wherein the entry of a field value in a field in the record selection mode without entry of a comparison operator causes said control means to compare the data to the field value with a preselected comparison operator.

14. The system of claim 9 wherein at least one symbol represented by keys mounted on said keyboard means is to be used as either data or a comparison or logic operator, said control means emphasizing the display of the symbol when used as a comparison operator or logic operator on said display means so that the function of the symbol is apparent.

15. The system of claim 9 wherein said control means recognizes selected symbols in comparing data to a field value, the selected symbols being preprogramed into said control means.

16. A system for processing information comprising:
keyboard means for operator input of keystroke information by actuation of keys thereon, said keyboard means having first and second sections, keys representing comparison and logic operators being positioned in the first section and keys representing data being positioned in the second section;
memory means for storing a file of information including a plurality of records, each record having a plurality of fields;
display means for displaying a cursor and a selected record in a table format, including a field heading to identify each field displayed, the system being operable in a input edit mode to display selected data on said display means in the table format, each portion of data displayed at the intersection of a row containing data in the record by which it is identified and the field by which it is identified, the system further being operable in a record selection mode; and
control means responsive to input of keystroke information from said keyboard means for forming a plurality of comparison groups within preselected fields and rows of said selected record, each of said comparison groups including a comparison operator and a field value, said control means identifying data in the preselected field where comparison is found to the selection criteria defined by the comparison operators, field values and logic operators, the entry of selection criteria in a plurality of fields within a given row displayed on said display means causing said control means to identify records of data where comparison is found with data in the row for each of the selection criteria, the entry of selection criteria entered in fields on distinct rows displayed on said display means causing said control means to identify each record having data where comparison is found to each of the selection criteria in at least one row.

17. The system of claim 16 wherein said control means further comprises syntax check routine means for identifying improper syntax in data and field values entered by the operator, said syntax check routine means identifying improper data or field values and directing said display means to inform the operator of the identification.

18. The system of claim 17 wherein said syntax check routine means further contains the type of data to be entered into each field, said control means examining each portion of data input by the operator for storage in a given field and identifying data of improper type for the given field, said syntax check routine means further causing said display means to inform the operator upon such identification.

19. The system of claim 16 wherein the entry of a field value without entry of a comparison operator in the record selection mode causes said control means to compare the data to the field value with a preselected comparison operator.

20. The system of claim 16 wherein at least one of the symbols represented by keys mounted on said keyboard means is used as data and either a comparison operator or a logic operator, said control means emphasizing the display of a symbol when used as a comparison operator or a logic operator on said display means so that the function of the symbol is apparent.

21. The system of claim 16 wherein said control means recognizes selected symbols in comparing data to a field value, the selected symbols being preprogramed into said control means.

22. A method for processing information in a system having a keyboard, a memory unit, a display unit and a control unit for interfacing therebetween comprising the steps of:

storing a file of information including a plurality of records, each record having a plurality of fields and rows;

displaying a selected record on the display unit when said system is in a record selection mode, and a cursor;

moving said cursor to a position within a preselected field of a predetermined row of said selected record displayed on said display unit;

inputting keystroke information into the keyboard to form a plurality of comparison groups in said preselected field, each of said comparison groups including a comparison operator and data representing a field value when said system is in the record selection mode;

comparing in the control unit the data stored within the preselected field of each record to the field value in the manner required by the comparison operator and identifying the records where comparison is found;

combining the identities of the records identified for each comparison group in a manner directed by a logic operator interrelating said comparison groups, said comparison groups and interrelating logic operator defining a selection criterion for the preselected field;

moving said cursor to a position within at least one other field of said predetermined row when said system is in the record selection mode;

inputting selection criteria to each of said other fields; and comparing in the control unit the data stored within each of the fields having selection criteria and identifying records when comparison is found to the selection criteria on any one of said fields having selection criteria.

23. The method of claim 22 wherein said step of moving said cursor to a position within at least one other field comprises moving the cursor to positions on the same row of the selected record as the position of the cursor when inputting the selection criteria to the preselected field, said step of comparing the data stored within each of the fields having selection criteria identifying only the records having data when comparisons are found to the selection criteria in each of said fields having selection criteria.

24. The method of claim 22 wherein said step of moving said cursor to a position within at least one other field comprises moving the cursor to positions on rows of the selected record other than the row where the cursor is positioned when inputting the selection criteria to the preselected field, said step of comparing the data stored within each of the fields having selection criteria identifying records having data when comparison is found to the selection criteria in any of the rows having selection criteria.

25. A method for processing information in a system having a keyboard, a memory unit, a display unit and a control unit for interfacing therebetween comprising the steps of:

storing a file of information including a plurality of records, each record having a plurality of fields;

displaying a selected record on the display unit when said system is in a record selection mode, and a cursor;

moving said cursor to a position on the display unit within a preselected field on a first row displayed on said display unit;

inputting keystroke information into the keyboard to form a comparison group including a comparison operator and data representing a field value when said system is in the record selection mode;

comparing in the control unit the data stored within the memory unit identified by the preselected field for each record to the field value in the manner required for the comparison operator and identifying records where comparison is found, input of keystroke information representing further comparison groups interrelated by logic operators comparing the data stored indentified by the preselected field for each record to identify records where comparison is found for each comparison group and combining the identities of the records identified for each comparison group in the manner directed by the logic operators interrelating said comparison groups, said comparison groups and interrelating logic operators defining selection criteria for the preselected field, inputting of additional selection criteria with the cursor positioned in fields other than the preselected field and in the first row identifying only records where comparison is found for each field having selection criteria in the first row, inputting of additional selection criteria with the cursor positioned in fields in rows other than the first row identifying records where comparison is found for any row having selection criteria therein.

* * * * *